United States Patent
Opittek et al.

[11] 3,915,548
[45] Oct. 28, 1975

[54] HOLOGRAPHIC LENS AND LIQUID CRYSTAL IMAGE SOURCE FOR HEAD-UP DISPLAY

[75] Inventors: Eugene W. Opittek, Tustin; William C. Hoffman, Torrance; Michael N. Ernstoff, Los Angeles; Richard N. Winner, Palos Verdes; Donald H. Close, Topanga, all of Calif.

[73] Assignee: Hughes Aircraft Company, Culver City, Calif.

[22] Filed: Nov. 29, 1974

[21] Appl. No.: 528,198

Related U.S. Application Data

[63] Continuation of Ser. No. 355,608, April 30, 1973, abandoned.

[52] U.S. Cl. ............ 350/3.5; 35/12 N; 350/160 LC; 350/174
[51] Int. Cl.² .......................................... G02B 27/10
[58] Field of Search ......... 350/3.5, 162 SF, 160 LC, 350/174; 35/12 N

[56] References Cited
UNITED STATES PATENTS

| | | |
|---|---|---|
| 3,631,411 | 12/1971 | Kosonocky .................... 350/3.5 |
| 3,633,988 | 1/1972 | Farrar ............................ 350/3.5 |
| 3,655,269 | 4/1972 | Heilmeier ................. 350/160 LC |
| 3,716,658 | 2/1973 | Rackman ................. 350/160 LC |
| 3,737,212 | 6/1973 | Antonson et al. ............... 350/3.5 |
| 3,744,879 | 7/1973 | Beard et al. ................ 350/162 SF |
| 3,807,829 | 4/1974 | Close ............................. 350/3.5 |
| 3,840,695 | 10/1974 | Fischer ..................... 350/160 LC |

Primary Examiner—Ronald J. Stern
Attorney, Agent, or Firm—W. H. MacAllister; Martin E. Gerry

[57] ABSTRACT

A head-up display system is disclosed for use in aircraft to display symbols and sensor video. The system uses an array of holographic elements on a transparent plate, or on the inside of the aircraft canopy, as both a collimating lens and a combiner for a light image from a liquid crystal source. An optimum system employs a holographic combiner/lens and a liquid crystal image source, but a holographic combiner/lens may be used with other image sources, and a liquid crystal image source may be used with other collimating lens and combiner arrangements. The thin and flat liquid crystal image source permits its use in an optimum position in the cockpit for both head-up and head-down viewing.

9 Claims, 25 Drawing Figures

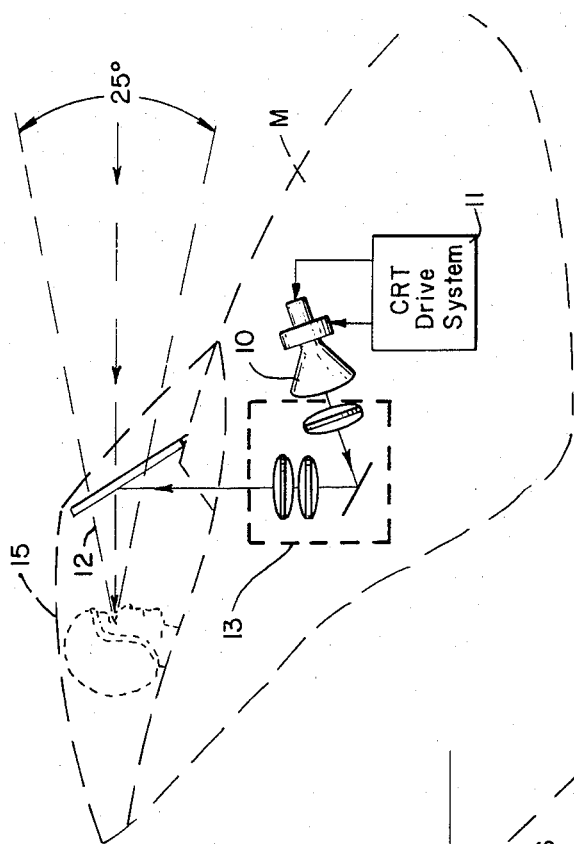
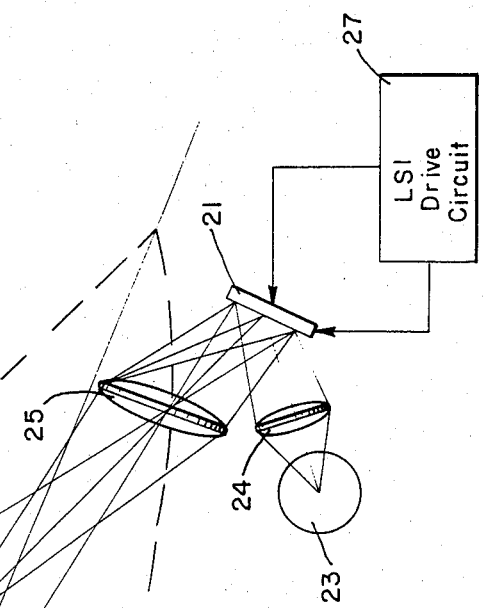
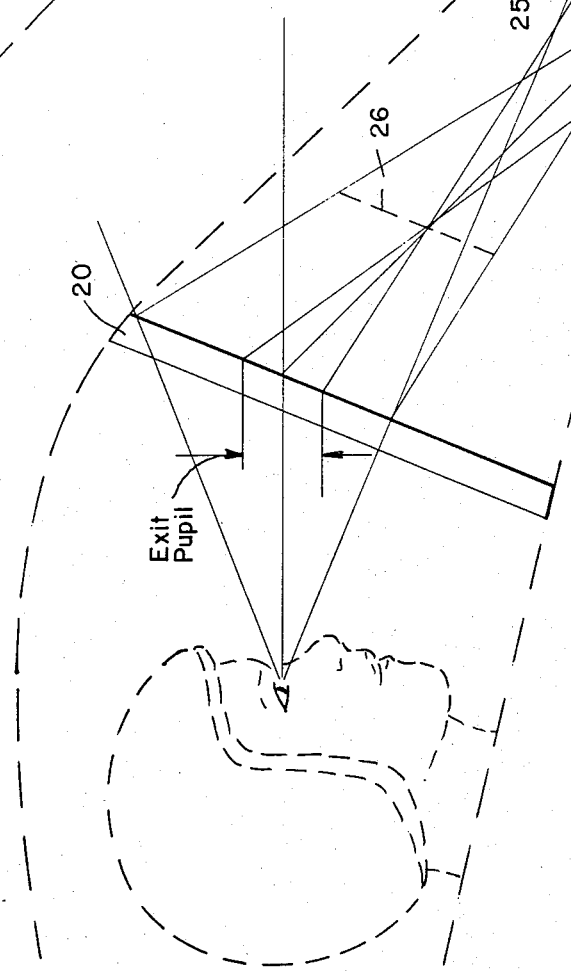
Fig. 1. PRIOR ART
Fig. 2.

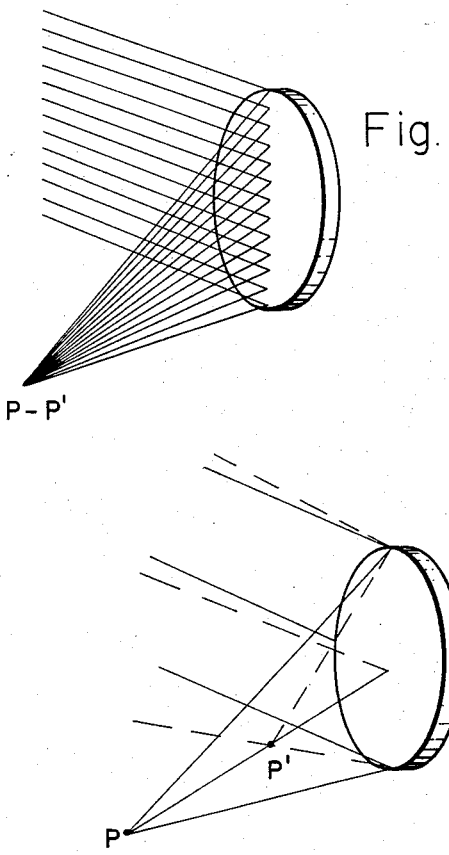
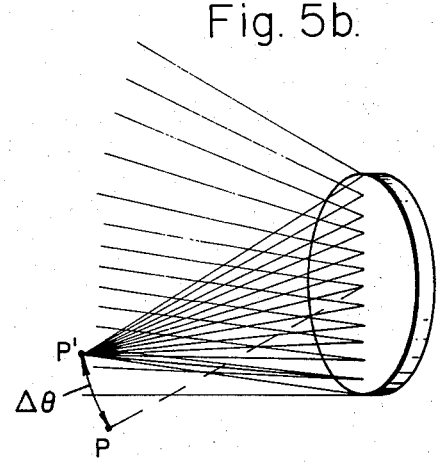
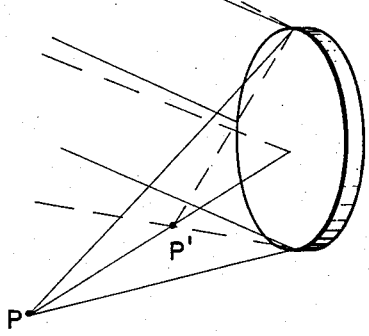
Fig. 4.
Fig. 5a.
Fig. 5b.
Fig. 5c.

Hologram Plate

Fig. 9.
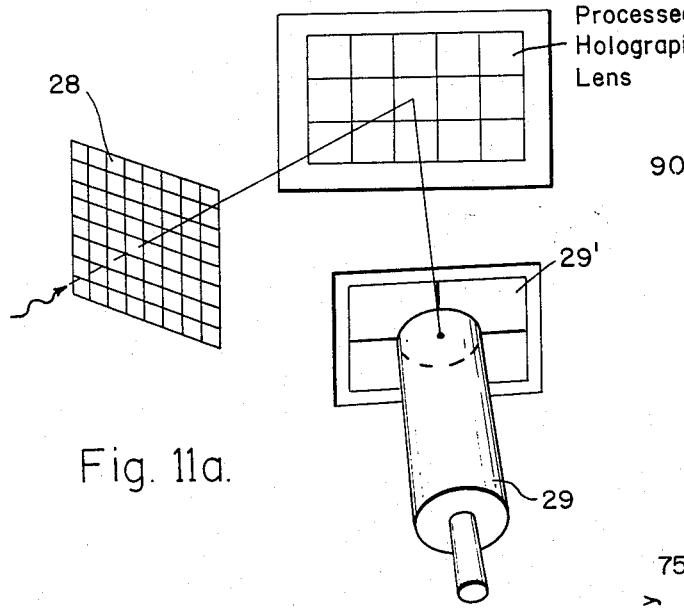
Fig. 11a.
Fig. 10.
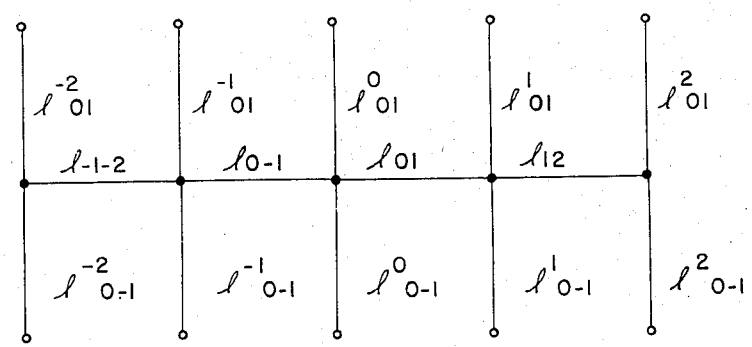
Fig. 11b.
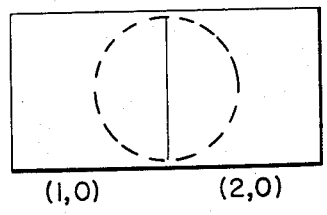

HOLOGRAPHIC LENS AND LIQUID CRYSTAL IMAGE SOURCE FOR HEAD-UP DISPLAY

The invention herein described was made in the course of or under a Contract or Subcontract thereunder with the Air Force.

This is a continuation of application Ser. No. 355,608, filed Apr. 30, 1973, now abandoned.

BACKGROUND OF THE INVENTION

This invention relates to an information display system for use in aircraft, and more particularly to a display system which projects an image of information onto a combining glass in the pilot's field of view to permit viewing the information while continuing to view the outside scene through the aircraft canopy, and to an information display system which permits the pilot of the aircraft to view information on display directly with his head down and indirectly through the combining glass with his head up.

Advanced high performance aircraft being developed, particularly those being developed for all weather operations, including military attack operations, require a system for display of information of various types and at various times. For example, while engaged in low level flight, the pilot's attention is mainly concerned with flying the aircraft and looking forward through the aircraft canopy at the terrain immediately in front of him. However, he must also continue to be concerned with, for example, the aircraft instrument panel. Consequently, systems have been developed which display necessary information on a flat, partially reflecting a transparent plate, hereinafter referred to as a combiner, for the pilot to view with his head up. Such a head-up display not only permits the pilot to continue viewing the terrain, but also alleviates the problem of visual refocusing required when switching from the outside view to the aircraft instrument panel, since the information presented on the combiner is collimated at infinity.

Information to be presented in a head-up display is, of course, not limited to instrument panel information. It may include necessary flight symbology and sensor video under all conditions. It is also sometimes desirable to permit direct viewing of such additional information, i.e., to provide head-down display of such information.

The basic types of existing head-up displays can be characterized as electro-mechanical or cathode-ray-tube (CRT) source systems with reflective or refractive optics. These basic displays are mainly analog, and have had extensive operational use in lead-computing optical sites. The symbols are deflected throughout the field of view by means of servo mechanisms acting on components in the optical path.

Disadvantages common to electro-mechanical servo systems are, for example, no flexibility to provide sensor video, and both hysteresis and limited dynamic response in the servo-mechanisms acting on components in the optical system used to position the symbols in the field of view. An additional disadvantage is that since the head-up display must interface with a central digital computer, digital-to-analog converters are required for the interface in order to drive the head-up display with digital information from the computer.

In a CRT source system, a high resolution, high brightness tube is utilized for generating all symbols displayed. The symbols projected on a combiner with an optical system are positioned by deflecting the CRT electron beam rather than by acting on components in the optical system through servo-mechanism. This offers instantaneous symbol response and simultaneous presentation of a large number of symbols. It also allows display of sensor data. However, display quality is limited by the CRT resolution and brightness.

In a head-up display having a CRT source and complex refractive optics, a refracting lens is used for image collimation, and a flat, partially reflecting transparent mirror combines the display images with the external scene viewed by the pilot through the aircraft canopy. The instantaneous monocular field of view is limited by the lens diameter, D, and the eye-to-lens distance, $d$, expressed by the following equation $\alpha = 2 \arctan(D \div 2d)$ where $\alpha$ is the total angle subtended by the pilot's eye. Binocular field of view represents the superposition of the instantaneous fields as seen by each of the observer's eyes. The instantaneous horizontal binocular field of view is expressed as $\alpha = 2\arctan[(D+S) \div 2d]$ where S is the eye spacing. It is therefore apparent that the instantaneous field of view is proportional to the lens diameter. Consequently, a wide field of view requires a large lens diameter. Increasing the lens diameter requires a proportional increase in the size of the reflecting mirror and consequently an increase in the required front panel area.

Limited head motion will result in varying portions of the display being visible, i.e., the exit pupil of the optics is some finite distance in front of the pilot thereby appearing to the pilot as a knothole through which he must look. The total field of view, that which is obtained with head movement, is a function of the real object (CRT face) diameter and the effective focal length, $f$, of the lens system defined by the relationship $\alpha = \arctan(D \div f)$. A short focal length is desirable for a system with a large total field of view in order to keep the CRT size, optical path, and hence package size to a minimum. Since the CRT has an appreciable line width, a short focal length will have an adverse effect on the display resolution and is undesirable from this standpoint.

In the case of a head-up display using a CRT source with off-axis reflective optics, the image source and the observer's eye are off axis with respect to the optical axis of an aspheric mirror and combiner. Consequently, the optical design is difficult. The system must handle rays that are significantly inclined to the axis and these rays must be accurate in order to minimize magnification distortion. As a result, the large reflecting surface of the combiner and one or more other lens surfaces must be aspheric. The forward surface of the aspheric combiner must be designed to minimize the distortion of the external scene viewed by the pilot through the aircraft canopy. This is extremely difficult to accomplish since the distortion is a complex function of eye position. The limiting element on the field of view of the off-axis optics is the size of the combiner.

An on-axis reflective optics effectively puts the image source, reflective optics and observers eye on the same optical path. A flat combiner acts as a double beam-splitter since the cathode ray tube image must pass through it before collimation by a spherical mirror. The limiting element on the field of view is the size of the spherical mirror. A disadvantage of this design is that the overhead spherical mirror obscures approximately 1° of vertical field of view, although this 1° is above the field of view of the head-up display. Another disadvantage is that it requires a CRT with a spherical face.

From the foregoing, it is evident that head-up displays employing existing techniques are limited in their performance due to the capabilities of conventional optics and cathode ray tube image sources. A number of systems have been designed for a 20° field of view using flat and aspheric combiners. For wider fields of view, the optics become very large and in general field flattening and distortion compensation become overpowering design constraints. This means that for the larger systems, such as a 30° field of view, the combining optics will generally be aspheric because of the wide angles, the large lens diameters and the short focal distances involved. However, aspheric optics are undesirable due to the specialized, expensive fabrication techniques required to fabricate the optics.

The ability to see symbology or video information on a head-up display with a bright background ambient is determined by the contrast of the presented information with respect to the backgound. It is desirable to provide a contrast ratio of 1.8 against a 10,000 foot-lambert background of solar reflection from a white cloud. There are several parameters which affect the ability of a head-up display to achieve this contrast ratio. One is the brightness of the source (CRT or projection lamp modulated in some way to provide the information), and another is the efficiency of the optical system. The optical efficiency is defined as the ratio of the output brightness to the input brightness. Assuming all lenses are anti-reflection coated, the surface reflections and bulk absorption should be lower than 2% and the mirror used in a reflective optics system can be 90% reflective. These components are therefore not considered to be the components which determine the optical efficiency of the conventional head-up display. The major factor which determines optical efficiency is the reflection and transmission of the combiner. Assuming a simple broad band combiner with 50% transmission and 50% reflection, the 10,000 foot-lambert outside ambient is reduced to an apparent 5,000 foot-lambert background by the combiner. Since a contrast ratio of 1.8 is needed, an apparent 8,000 foot-lambert image source is required since only 50% of the source is reflected into the pilot's eyes. It is evident that a system using such a combiner does not represent an optimum configuration for a contrast ratio of 1.8 against a 10,000 foot-lambert background due to this very high source of brightness requirement. In addition, the 50% transmission of the ambient illumination seriously reduces night vision through the combiner. An improved combiner for night vision would transmit 80% and reflect 20%. This would result in a maximum apparent background illuminance of 8,000 foot-lamberts and a symbology luminance of 6,400 foot-lamberts. Since only 20% of the source is reflected back into the pilot's eyes by the combiner, a 32,000 foot-lambert source is required, and that is not even considering other optical efficiency factors. These figures indicate that a broad spectrum combiner is impractical for high head-up display brightness requirements using conventional techniques.

One way to partially alleviate this problem of the reflection and transmission of the combiner in present head-up display systems is to use a spectral (dichroic or trichroic) combiner. Reflection and transmission characteristics of spectral combiners are a function of the wavelength of the incident light. Typically, 90% of the light except for a narrow band (several hundred Angstroms) is transmitted. In this narrow band, only 25% is transmitted and 70% is reflected. Assuming a 10,000 foot-lamberts background, 9,000 foot-lamberts is transmitted from the outside to the pilot's eyes. To provide the 1.8 contrast with 0.75 reflectivity of an image display, a light source of 9,600 foot-lamberts is required for the image source. One disadvantage is that the source must be well matched to the spectral reflective wave-length of the combiner; otherwise, the overall efficiency is lowered. Another disadvantage is the change in the coloration of the outside scene as viewed through the combiner since a several hundred Angstroms band is removed from the outside scene by the combiner, thus tinting the outside scene.

The second major consideration for head-up display brightness/contrast is the light source. The light illuminated reticles associated with the electro-mechanical head-up displays are unacceptable for advanced head-up display applications due to their inflexibility and inability to display electro-optical video. The CRT is the source used in most advanced head-up displays. The primary operational disadvantage of the CRT is the relatively low peak intensity achievable. A head-up display having a 45° × 60° field of view at a viewing distance of two feet requires a large combiner (four feet square). To provide the 9,600 foot-lamberts with a dichroic combiner, radiated power on the order of 50 watts is required from the CRT phosphor. This is due to the sensor display requirement which in the worst case necessitates the display of high brightness video over the entire field of view. The conversion efficiency of a good phosphor in a CRT is approximately 5%, varying greatly with screen preparation, beam current density and age. This efficiency would require a maximum beam power of 1 killowatt, where typical high brightness tubes may be rated around 10 watts. It is unlikely that such a tube could be bult because of the beam power requirement and the phosphor loading in a conventional structure. One method that has been used on projection tubes has been to fabricate a water-cooled face plate and to view the radiation from the rear of the tube through an optical port hole. Such a tube would be quite large and very inefficient. Thus, the cathode ray tube is not suitable as an image source for a head-up display having a contrast ratio of 1.8 against a 10,000 foot-lambert background. The 2,000 foot-lambert capability of existing head-up displays is sufficient for viewing symbology only over a narrow field of view at limited resolution against a lower background brightness.

The accuracy of a head-up display is defined as the precision with which the symbols can be generated, superimposed upon a selected reference object, and retained while the unit is in operation. The contributing factors to errors in a head-up display are image displacement caused by the combiner, fabrication and alignment errors, and paralax and collimation errors. It is desirable that the combiner have the least possible effect on the apparent position and shape of objects viewed through it. This is especially important when one eye may be looking through the combiner while the other may be viewing the same scene directly off one side of the combiner. Both the refractive and on-axis reflective objects of head-up display systems have flat combiners which have a negligible effect on the view of distant scenes. The off-axis reflective optics of head-up display systems uses an aspheric combiner and therefore has an effect on the appearance of scenes viewed through it. Analytical and measuring data indicate an error of 0.5 to 5.0 mrads, depending on viewing distance and on the point through which the combiner is being viewed.

The principle concern with regard to optical errors is parallax, or the change in the apparent relative positions of the cathode ray tube information with respect to the outside scene when viewed from different head positions. The requirement to maintain one mrad accuracy and resolution over the entire field of view is met by present limited field of view head-up display systems. However, for a field of view of 60° × 45° with conventional optical techniques, the design problems become almost insurmountable if an accuracy and resolution of 1 mrad is to be maintained over the entire field of view. It is therefore evident that conventional optics for a head-up display system cannot be made to meet the requirements of a large field of view, a contrast ratio of 1.8 against a 10,000 foot-lambert background, and 1 mrad accuracy in resolution over the entire field of view.

The current designs of head-up displays with collimated images use conventional optics which result in heavy optical systems that require a disporportionate amount of cockpit space. What is required is a technique for head-up display systems capable of reducing the weight and space of the optics. It would also be desirable to increase the field of view for both weapon delivery and normal flight information. Because of the operational requirement for a large number of symbols, scale changes sensor video, and alternate display modes, a modern head-up display typically uses a CRT as the image source which is also bulky, adding significantly to the size and weight of the optics in the system. In other words, what is desired is a device mounted above the cowl of an aircraft which provides the pilot a partially transparent collimated image of various symbols and sensor video for flight control, weapon delivery, navigation and the like, without either bulky optics for producing a collimated image or a bulky image source.

Before describing preferred embodiments of the invention, a typical prior art head-up display using a cathode ray tube image source with refractive optics will be described with reference to FIG. 1. The head-up display employs a high resolution, high brightness CRT 10 for generating all images to be displayed under control of conventional CRT drive system 11. The images are projected on a combining glass 12 through an optical system 13. The combining glass is mounted above cowl 14 of an aircraft to provide the pilot with a partially transparent collimated image for the CRT combined with the outside scene viewed by the pilot through the combining glass and canopy 15 enclosing the combining glass in the cockpit of the aircraft.

The images displayed are generated and positioned by rflecting and modulating the CRT electron beam. As in the present invention, this prior art head-up display offers instantaneous response of the image source, simultaneous presentation of a large number of symbols as well as video display, and growth potential. The display quality is limited by the CRT resolution and brightness. However, the optics 13, here illustrated as refractive optics, limit the field of view of displayed image to 25° in azimuth and elevation. A head-up display with reflective optics is similarly restricted and in both cases the optics constitute a bulky and heavy package which must be accommodated in the already crowded cockpit. Electro-mechanical head-up display systems are equally limited in field of view and even more bulky.

A CRT image source has the advantage of versatility in generating images to be displayed but a cathode ray tube is also bulky, making the prior art system shown in FIG. 1 even more difficult to accommodate in a crowded cockpit and, as in any CRT display, the image source is susceptible to electro-magnetic and electrical noise so that the system is sensitive to its operational environment. The system is also very limited in brightness. In addition, the head-up display must be boresighted to the aircraft line of sight and must therefore be hard mounted. That subjects the cathode ray tube to a high level of shock and vibration. Therefore, a cathode ray tube must be made extremely rugged to withstand such shock and vibration.

The primary reason for the limited field of view in the prior art systems is that if a reasonable exit pupil and viewing distance to the combining lens is to be maintained, a large lens is required to provide a large field of view. A lens and combiner larger than 1 foot in diameter would be required to provide a 30° field of view for a viewing distance of 26 inches with no allowance for lateral motion or exit pupil at the edge of the field. A nominal allowance of three inches would cause the size of the lens to approach 20 inches in diameter. An increase in the field of view to 60° would force to lens diameter to increase to approximately 3 feet. This would clearly be too large, complex and expensive to consider for high performance tactical aircraft.

SUMMARY OF THE INVENTION

A head-up display is provided without a bulky image source and/or bulky optical lens system for image collimation by using a liquid crystal image source and/or a holographic lens. The holographic lens is constructed in a transparent, light-sensitive film on the face of a rigid transparent sheet (flat or curved) so placed to cover a large portion of the pilot's field of view as to combine a display image from a source with the outside scene viewed by the pilot. The holographic lens is constructed by allowing collimated coherent light of a known wavelength to interfere with diverging coherent light of the same wavelength from a predetermined plane on the same or opposite side of the film and recording the reflective or transmissive interference pattern produced in the transparent film. Once the hologram is recorded and processed, diverging light from the predetermined plane is replaced in the head-up display system by an image source having a peak band of wavelengths within the operating bandwidth of the holographic lens. In that manner, the image source causes the the holographic lens to accurately generate the collimated coherent light, thereby causing the image source to be projected to infinity. A second transmissive holographic film having no focal power may be superimposed on a first transmissive holographic film to form a pseudo in-line transmissive holographic lens. The second holographic film is constructed in the same manner as the first but with the source of diverging light collimated to appear to come from the same direction from a source at infinity.

In one aspect of the invention, the image source may take any form which produces light of the operating wavelength of the holographic lens, such as a cathode ray tube, a modulated laser beam scanning the extended field covered by the holographic lens, a flat panel of light emitting diodes, and the like, but in accordance with another aspect of the invention, the image source is a flat panel display formed by sandwiching a thin layer of liquid crystal material between a transparent nonconductive plate covered on the inside surface with a transparent conductive film and a back plate of nonconductive material, and an array of horizontal and vertical transparent conductors between the plates. The liquid crystal material is normally transparent, but it can be made to scatter incident light with the application of an electric field between pads forming capacitors at the intersections of conductors on the plates. By selectively energizing the conductors through suitable addressing means, and storing a charge thus produced in select capacitors, a latent image can be formed. A light image to be projected and combined with the outside scene by the holographic lens is created by this latent (field) image through the liquid crystal material when it is illuminated by a source of high efficiency in the spectral bandwidth of the holographic lens. The image may be formed by modulated transmission of light from the source to the holographic lens through the liquid crystal material, in which case all the electrical circuit elements on both plates are transparent, or by modulated reflection of light from the source to the holographic lens, in which case all of the electrical circuit elements on the back plate are reflective, particularly the pads of the capacitors. In either case, the liquid crystal material between two pads of a capacitor charged by selectively energizing horizontal and vertical conductors forms a light modulating device.

In another aspect of the invention, the collimating lens system and combiner of a conventional head-up display may be used with a liquid crystal display system to achieve the advantage of compactness and brightness of the liquid crystal display with the ability of electronically positioning the image displayed and the flexibility of displaying sensor video.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 1 illustrates a typical prior art head-up display system.

FIG. 2 illustrates a first embodiment of the present invention.

FIG. 4 illustrates in a chart the manner in which three types of holograms may be recorded for use as an optical element having focal power.

FIGS. 5a, 5b and 5c illustrate inaccuracies of a holographic lens for off-axis and off-focal plane reconstruction.

FIG. 9 illustrates incremental displacements of a diverging beam point source to form the array of FIG. 8.

FIG. 10 illustrates the spectral efficiency of a typical reflection hologram recorded in dichromated gelatin.

FIG. 11a illustrates schematically a test fixture for evaluating a hologram array, and FIG. 11b is an illustration used in describing the use of the test fixture.

FIG. 16a is a plan view of liquid crystal cell in the display system and FIGS. 16b and 16c are sectional views taken along the respective lines A—A and B—B of FIG. 16a.

DESCRIPTION OF THE PREFERRED EMBODIMENTS

FIRST EMBODIMENT

A first exemplary embodiment of an advanced approach to wide angle head-up display will now be described with reference to FIG. 2. The approach is to employ a holographic lens 20 to both collimate an image from a source 21 and to combine the image with the outside scene viewed by the pilot over a wide angle in both elevation (45°) and azimuth (60°). In that manner, holographic optics provide the functions of both the conventional combiner and projection lens. Eliminating the large projection lens is a major improvement, particularly since the formation of a holographic lens may be easier than manufacturing a high quality projection lens.

At the outset it should be clearly understood that the holographic lens need not be an array of simple holographic lens elements — it may be any holographic element or elements capable of providing adequately high efficiency across the desired field of view, with aberrations that are sufficiently low to allow the desired system performance. However, in particular, a single, large simple holographic lens element formed with one point source in the object plane and the other at infinity along the viewing direction, is not adequate in terms of efficiency nor in terms of image quality.

Figure 3:
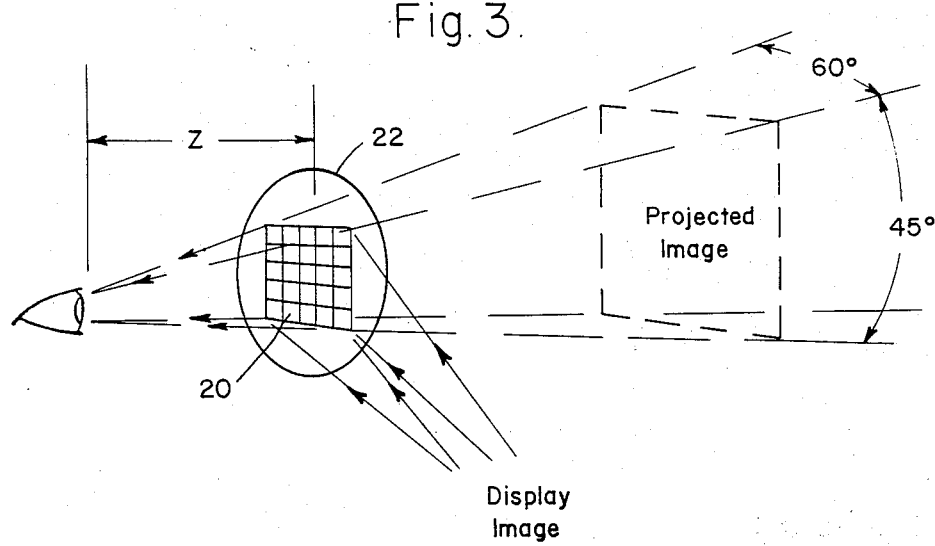
FIG. 3 illustrates schematically an array of holograms on transparent substrate functioning as a lens.

In this exemplary embodiment, the holographic lens 20 is comprised of an array of holograms recorded on a suitable recording medium on the face of a transparent substrate. The array is represented by a grid of vertical and horizontal lines on a transparent substrate 22 in FIG. 3. The density of this grid may be increased without limit to provide what may be called a "continuous" holographic lens. A reasonable viewing distance Z of about 26 inches presents to the pilot a projected image over a wide field of view limited only by the size of the holographic lens, which may be virtually the same size as the largest combiner which may be accommodated. The image source 21 is a liquid crystal array which modulates reflected light from a high intensity source 23. A collimating lens 24 assures that each reflecting point of the liquid crystal array receives a beam of light with the same angle of incidence. A relay lens 25 forms a virtual image of the modulated light from the liquid crystal array at a focal plane 26. The points of that virtual image are the point sources of light used for playback of recorded holograms as will be described with reference to FIG. 4. The result is that the pilot sees the points of the virtual image as coming from points at an infinite distance in front of him.

Holographic Lens

Before describing in greater detail the array of holograms which make up the holographic lens 20 in the system of FIG. 2, the manner in which a single hologram may be formed for use as a lens (an optical element having focal power) will first be described with reference to FIG. 4 which illustrates in a chart three techniques for recording a hologram and thereafter playing back the hologram for three different types of holographic lenses, namely a reflection type, a transmission type, and a pseudo in-line transmission type. Only so much of the field of holography will be discussed as is necessary to understand the concept of the invention in preferred embodiments. More extensive treatments of the field of holography may be found in numerous references.

A hologram is a recording of the wave interference patterns formed when two beams, an object beam O and a reference beam R, of sufficiently coherent light from two point sources are superimposed in a suitable rcording medium. The two point sources can be considered the two conjugate points of a lens. For a head-up display application, the two points are chosen such that playback from a desired image source position P' at or near one recording point P results in a collimated beam I from the holographic lens, i.e., the image beam from the playback point P' is collimated. In that manner, light from the image point P' appears to come from the other conjugate point of the lens at infinity, thereby providing the function of a virtual image lens. The reflection and transmission types of holographic lens shown in the chart of FIG. 4 are the two fundamental types of off-axis holograms. The third type, the pseudo in-line transmission type, is a combination of two off-axis transmission holograms, the second having its two conjugate points at infinity. This third type has two interesting properties. First, it is approximately axially symmetric and therefore has lower distortion. Second, it has considerably smaller chromatic dispersion than the other two types. All three types can be used in head-up display systems as will be shown.

A hologram is recorded by illuminating light-sensitive recording material with two beams of light from the same coherent source of known wavelength. Both beams originate from point sources, one of which is at infinity as indicated in the chart by parallel rays for the reference (beam R) in each case of recording. After the hologram has been recorded and processed, it can be illuminated by either of the two recording beams at the operating wavelength to cause it to accurately generate for viewing the other recording beam as indicated in the chart under the playback column. Thus, a diverging object beam, O, from a point P' interacts with the hologram to recreate the collimated reference beam R.

A viewer looking into this beam sees the point P' projected to infinity by the hologram. If the point P' is displaced, the direction of the collimated beam changes by an angle equal to the angle subtended by the two point-source locations at the hologram. Therefore, the hologram has the ability to image an extended field. This field consists of only light at the operating wavelength. To the rest of the spectrum, the hologram array acts as a clear plate.

Figure 6:
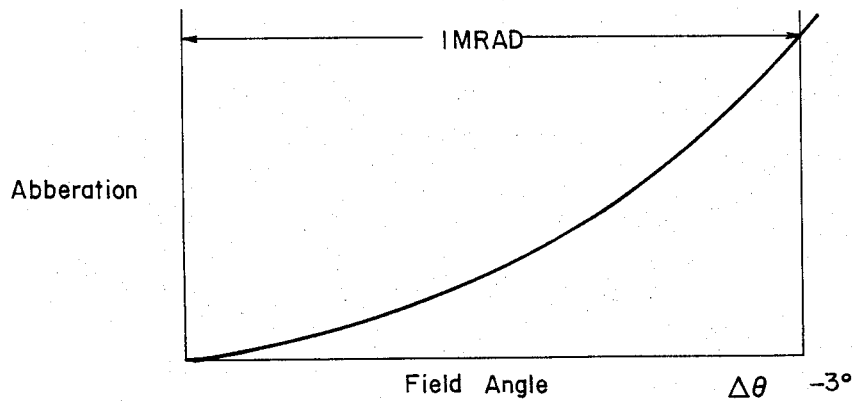
FIG. 6 is a graph of reconstruction error in a hologram as a function of off-axis angle.

Although the hologram can image an extended field, it does not do so with unlimited accuracy. Aberrations appear for off-axis reconstruction. These deviations are largest for rays near the edge of the hologram and increase as the displacement of the imaged point, P', from the hologram recording point, P, is increased, as shown by comparison in FIGS. 5a and 5b. If the imaged point P' is at the recording point, there are no aberrations as shown in FIG. 5a, but if the imaged point P' is offset transversely from the recording point, there are, as shown in FIG. 5b. In other words, the aberrations (deviation of rays from the expected direction of a collimated beam) increase as the field angle, $\Delta\theta$, is increased and as the $f$-number is decreased. If a typical maximum aberration is plotted as a function of the field angle as shown in FIG. 6 for a given $f$-number, it is apparent that the aberration becomes 1 mrad at a half-field angle of 3° to 5° for typical hologram parameters. The holographic lens employed in the present invention will provide image resolution and accuracy of better than 1 mrad over field angles of 30° to 45°.

Effects of the off-axis aberrations indicated schematically in FIG. 5b depend strongly on applicable hologram parameters, particularly the off-axis angle, the asymmetry angle, and the size of the viewing pupil. For viewing with the eye, the effects of the aberrations are generally to introduce distortion rather than a loss of resolution, because over a bundle of rays the size of the eye pupil, the ray directions do not vary appreciably. However, as pupil location is changed, the average ray direction changes, causing the apparent image location to shift.

Another characteristic of these holograms is that as the object point P' is moved from the hologram construction location P, the efficiency of conversion of the diverging beam into the collimated beam decreases. This loss of optical efficiency arises because the conversion process is Bragg diffraction from the recorded fringe planes in the hologram medium, a process sensitive to the beam angles. This angular dependence of optical efficiency effects the optical efficiency of a single hologram lens as a function of the field of view. For typical geometries, the angular width of the efficiency curve is 5° to 10° in the plane containing the optical axis and somewhat larger in the perpendicular plane.

As in other types of lens, deviation of the object from the focal plane will also cause aberrations, as shown in FIG. 5c. However, it is a relatively simple problem to mount the image source in the focal plane of the lens, and so secure the holographic lens and the image source that proper focus is maintained within acceptable tolerances.

In order to achieve the indicated performance of the present invention, it is necessary to use a multiple-element holographic lens, i.e., an array of holograms or its equivalence in the form of a "continuous" holographic lens, as suggested hereinbefore. A single element hologram system cannot provide the required optical efficiency, and the more nonlinear distortion of the single element hologram leads to much larger binocular disparities. This behavior is not surprising, since a single optical element hologram, like a single lens or mirror element, has large off-axis aberrations. Therefore, a multiple-element or a "continuous" holographic lens (hereinafter referred to generically as simple a "holographic lens") is required. This is analogous to multiple-element lens required for a conventional head-up display, but is advantageously unique in that all elements (holograms) may be provided on a transparent substrate, and in that the holographic lens also functions as the combining plate.

This array concept is based on the fact that in an optical system like the head-up display system of FIG. 2, rays from a single point in the field of view that enter the viewer's eye come through only a small part of the projection aperture. In other words, different parts of the projection aperture correspond to different parts of the field of view. This means that the angular field and the projection aperture can be divided into small segments, and one can synthesize a small hologram (referred to hereinafter as a "holographic element") in each segment of the field of view. If these holographic elements are small enough and accurately aligned, they project a continuous high-quality image over the entire field of view.

The fundamental advantages of this array concept are a reduction in the loss of resolution and distortion due to off-axis aberrations and a more uniform optical efficiency across the projection aperture. To maximize these advantages, it is necessary to deal with two difficulties associated with implementing the array concept. First, an array can exhibit distortion that varies with eye position, although usually far less than for a single hologram. Second, the presence of intersections between adjacent holographic elements in the array introduces the possibility of discontinuities in the image if proper alignment is not achieved. What is required then is simply a system design that eliminates or adequately reduces the imaging errors that occur in the array in a configuration that is acceptable from a systems viewpoint.

Design of an array of holographic elements for use in projecting an image to infinity is based on two criteria: first, that the image be viewed from a certain location (the pupil location); and second, that adjacent elements of the array provide a continuous image to the observer. The first criterion is met by forming each element with a collimated reference bean that passes through the pupil location and a diverging beam from a point source located in the system image source plane. The second criterion is met by choosing the locations of the point sources such that the fringe planes in two elements are parallel at the intersection of the elements, thereby providing a "mirror without a kink."

The basic design approach will now be described more fully for a reflection holographic lens having an array of discrete holographic elements. It is pointed out that this basic design can have unaligned intersections between elements of the array at which localized distortion can occur even when there is no average system distortion. However, in a proper design, this local distortion is reduced to insignificant proportions. But first, a brief outline of the process of two-dimensional array formation is as follows:

1. Construct and calibrate the hologram forming apparatus.

2. Calculate the apparatus settings for each of the element exposures in the array.

3. Prepare photographic plates, e.g., dichromated gelatin plates, and insert a plate into the hologram forming apparatus.

4. Make the set of reflection hologram exposures and process the plate.

5. Place the finished array in the test fixture and evaluate its performance.

6. If necessary, correct the apparatus settings and/or the exposure levels for the appropriate array elements, and repeat steps 4 through 6 until an array is produced that is acceptable, each time using a fresh plate.

7. Place the last array in a display system for use, and store the apparatus settings and exposure levels for use in producing additional arrays.

Figure 7:
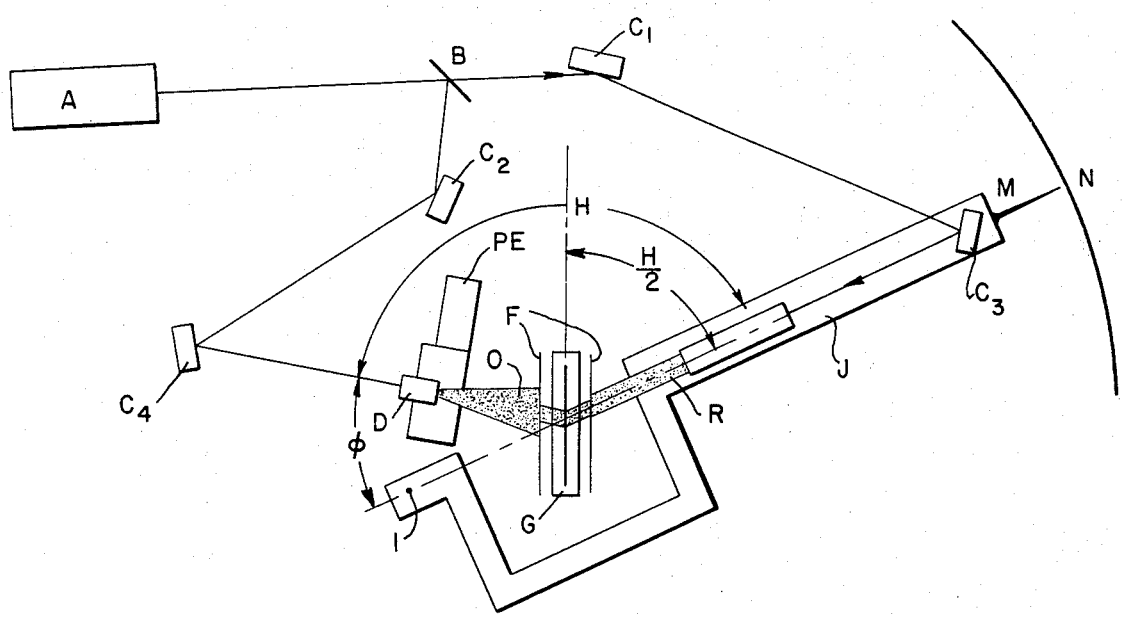
FIG. 7 is a schematic diagram of apparatus for forming an array of holograms to be used as a holographic lens.

A plan view of the apparatus required to position the reference and object beams for this example for producing a reflection holographic lens is shown schematically in FIG. 7 in which the parts A through N are as follows:

A. Laser operating with adequately long coherence length at the wavelength desired for the hologram recording, which depends largely upon the recording material used, such as 514 nm for dichromated gelatin.

B. Dielectric beamsplitter providing approximately 1:1 power ratio in two beams.

C. $C_1$, $C_2$, $C_3$ and $C_4$ moveable and adjustable mirrors.

D. Beam expander and spatial filter to provide, for example, a 3–5 $\mu$m-diameter source as a point source.

E. Recollimating telescope and spatial filter to provide a collimated beam source somewhat larger in diameter than the holographic elements to be formed.

F. Adjustable masks to fix the holographic element size, shape and location, one on each side of a plate for each hologram element of the array to be formed.

G. Oriented plate holder.

I. Pivot point, in a plane containing the center point Q (FIG. 8) of the array on the plate and a line normal to the plate.

J. Pivot arm carrying elements E and $C_3$ about the pivot point.

K. Gimbal mount having two axes carrying beam expander and spatial filter D the spatial filter pinhole of which is located at the intersection of the two perpendicular gimbal axes to provide a positioned point source.

M. Pointer attached to pivot arm J, used to set the pivot arm at a specified angle.

N. Two-dimensional scale to be used in conjunction with the pointer M to position the pivot arm reproducibly within 0.2 mrad. One scale is for measuring position of the arm J about the pivot point I in the plane of the paper, and the other is for measuring position about the pivot point I in a plane normal to the paper.

O. Diverging beam from pinhole point source of D.

PE. Positioning elements to reproducibly locate the point-source pinhole of the beam expander and spatial filter D in space with 25 $\mu$ accuracy by positioning the gimbal mount K.

R. Collimated beam from E.

Stability of the apparatus, provided through use of techniques, such as adjusting screws and lock nuts, that constitute standard practice, must be adequate to record 180° holograms with 10 min. exposure times. Location of the pivot point I, orientation of the plate, dimensions of the apparatus, and settings of the pivot arm J, the gimbal K, the positioning elements PE and two apertures in the mask F for each hologram exposure and determined by the display system parameters and the array design parameters as described hereinafter. The mirrors $C_1$, $C_2$, $C_3$ and $C_4$ are used to direct the two laser beams formed by the laser A and beamsplitter B, through beam expander and spatial filter D and recollimating telescope and spatial filter E to form the diverging object beam, 0, and the collimated reference beam R. Adjustment of these mirrors is made for each hologram exposure of the array.

Figure 8:
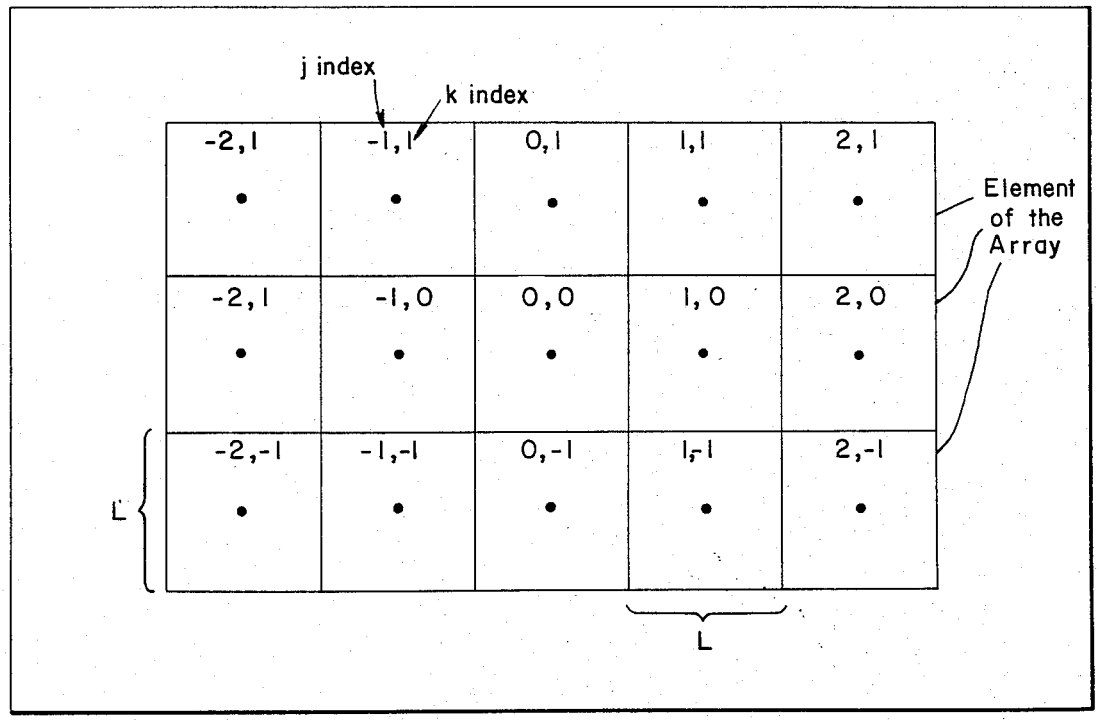
FIG. 8 illustrates an exemplary array of holograms formed with the apparatus of FIG. 7 to provide a holographic lens.

When the diverging beam, 0, is directed toward the location of the center, 0, of the array on the plate, as shown in FIG. 8, and its axis is coplanar with points Q and I, the distance between the diverging beam pinhole source and point Q is the array focal length, $f$. The distance from point Q to the pivot point I is the pupil to array spacing $d$. The angle formed by points, I, Q and the diverging beam pinhole is $\phi$, the viewing angle for the array. When aligned for the central hologram of the array, the diverging object beam axis and the collimated reference beam axis pass through the central point Q and have an included angle of $H = \pi - \phi$. The plate is oriented so that its plane bisects the angle H in this example, but that is not necessary.

The array is a set of contiguous holograms identified by indices $(j,k)$ as indicated in FIG. 8 which, for simplicity, shows only a 3 × 5 array as viewed from the diverging beam point source location. The hologram elements are all of the same size, but need not be squares of the dimension L shown.

FIG. 9 shows the arrays of diverging beam point source locations, as viewed from the area of mirror $C_4$. The central location corresponds to element (0,0) as described above. The displacement $l_{01}$ from that location gives the location corresponding to element (1,0), etc. The location array in this example lies in a plane perpendicular to the central diverging beam direction but that is not necessary, and the displacement between the locations for two elements of the array is such that the new location is approximately coplanar with the old location and the centers of the two corresponding elements. The angular offsets of the collimated beam are chosen such that the collimated beam axis passes through the center of the particular hologram element and through the pivot point I.

Recursive equations for determining the $\Delta\theta_j$, where $\Delta\theta_j$ is the angular offset of the collimated beam axis between the (j-1,0) element and the (j,0) element, are as follows:

$$\tan \Delta\theta_j = \frac{\sin(\frac{H}{2} \pm \theta_{j-1})}{\frac{d_{j-1}}{L} \pm \cos(\frac{H}{2} \pm \theta_{j-1})} \quad (1)$$

$$d_j = d_{j-1} \frac{\sin(\frac{H}{2} \pm \theta_{j-1})}{\sin(\frac{H}{2} \pm \theta_{j-1} \pm \Delta\theta_j)} \quad (2)$$

where $\theta_0 = 0$, $d_0 = d$.

$$\theta_{j-1} = \sum_{m=1}^{j-1} \Delta\theta_m \quad (j \geq 2) \quad (3)$$

and the upper (lower) sign applies for $j$ negative (positive) in FIG. 8. The subscripts in Equations (1) through (3) are taken to be positive.

The quantities $\Delta\theta_k^j$, where $\Delta\theta_k^j$ is the angular offset of the collimated beam axis between the $(j,k-1)$ and $(j,k)$ elements, are given by the recursive Equations:

$$\tan \Delta\theta_k^j = \frac{\cos\theta_{k-1}^j}{\frac{d_{k-1}^j}{L} + \sin\theta_{k-1}^j} \quad (4)$$

$$d_k^j = d_{k-1}^j \frac{\cos\theta_{k-1}^j}{\cos(\theta_{k-1}^j + \Delta\theta_k^j)} \quad (5)$$

and $$\theta_{k-1}^j = \sum_{m=1}^{k-1} \Delta\theta_m^j \quad (k \geq 2) \quad (6)$$

where $\theta_0^j = 0$ and $d_0^j = d$ from Equation (2). Equations (4) through (6) hold for positive and negative $k$ in FIG. 8; the $k$ subscripts are positive, while the $j$ superscripts are positive or negative corresponding to FIG. 8. This example does not allow a general skew geometry which may be provided if desired using more general equations to be set forth hereinafter.

An analysis leads to further sets of recursive equations for calculating the incremental displacements of the diverging beam point source (shown in FIG. 9) in terms of the array parameters and the angular offsets of the collimated beam, determined above. The $l_{j-1,j}$ of FIG. 9 are determined from the following formulas:

$$l_{j-1,j} = \frac{X_{j-1,j}\sin\Delta\theta_j}{\cos B_j} \quad (7)$$

$$X_{j,j-1} = \frac{X_{j-1,j}\cos A_{j-1}}{\cos B_j} \quad (8)$$

$$\tan \psi_j = \frac{\sin C_j}{\frac{X_{j,j-1}}{L} - \cos C_j} \quad (9)$$

and $$X_{j,j-1} = \frac{X_{j,j-1}\sin C_j}{\sin D_j} \quad (10)$$

where $$\tan \psi_n = \frac{\sin C_n}{\frac{2f}{L} - \cos C_n} \quad (11)$$

$$X_{01} = \frac{f \sin C_n}{\sin D_n} \quad (12)$$

$$B_j = B_{j-1} + \Delta\theta_j - \Psi_{j-1} \quad (13)$$
$$A_j = A_{j-1} + \Psi_j - \Delta\theta_j \quad (14)$$
$$C_j = C_{j-1} + \Psi_{j-1} - \Delta\theta_j \quad (15)$$
$$D_j = C_j + \Psi_j \quad (16)$$

$j = 1, 2, \ldots$, $A_o = \Psi_o$, and $B_o = 0$. $C_o = H/2$ ($\pi$-H/2) for negative (positive) values of $j$ in FIG. 8. The subscripts in Equations (7) through (16) are taken to be positive (absolute value of $j$ in FIG. 8). The array focal length $f$, is as defined hereinbefore.

The $l_{k-1,k}^j$ of FIG. 9 are determined by the following formulas:

$$l_{k-1,k}^j = \frac{X_{k-1,k}^j \sin \Delta \theta_k^j}{\cos K_k^j} \tag{17}$$

$$X_{k,k-1}^j = X_{k-1,k}^j \frac{\cos J_{k-1}^j}{\cos K_k^j} \tag{18}$$

$$\tan \psi_k^j = \frac{\cos K_k^j}{\frac{X_{k,k-1}^j}{L} + \sin K_k^j} \tag{19}$$

and $$X_{k,k-1}^j = X_{k,k-1}^j \frac{\cos K_k^j}{\cos M_k^j} \tag{20}$$

where
$$\tan \Psi_o^j = L/2f_j, \tag{21}$$

$$f_j = [\frac{L^2}{4} + X_{o,j-1}^2 - LX_{o,j-1} \cos C_j]^{\frac{1}{2}}, \tag{22}$$

$$X_o^j = f_j/\cos \Psi_o^j, \tag{23}$$
$$K_k^j = K_{k-1}^j + \Psi_{k-1}^j - \Delta \theta_k^j, \tag{24}$$
$$J_k^j = J_{k-1}^j + \Psi_k^j - \Delta \theta_k^j, \tag{25}$$
$$M_k^j = K_k^j + \Psi_k^j, \tag{26}$$

where $K_o^j = 0$, and $J_o^j = \Psi_o^j$. The $k$ subscripts are taken to be positive; the equations are independent of the sign of $k$ in FIG. 8. The superscript $j$ is positive or negative, corresponding to FIG. 8.

The equations in the above discussion therefore allow one to calculate the angular offsets of the collimated beam and the incremented displacements of the diverging beam point source in terms of the array parameters $\theta$, L, $d$, and $f$.

The array formation procedure is to set the collimated beam R to the angular offset corresponding to a certain element of the array using the pointer M and scale N; set the diverging beam point source position to the corresponding displacement from the central position, using the positioning elements PE; orient the gimbal K such that the diverging beam is directed toward the desired hologram position on the array; position the apertures F such that the desired hologram area is illuminated by both beams; and expose the hologram. This procedure is repeated for each hologram element of the array.

When the reflection hologram array is thus prepared, each element has its own point P for on-axis reconstruction as illustrated in FIG. 5a. In other words, for each element of the array on the holographic lens/combiner 20, a point P was selected during recording to provide a collimated beam to the pilot through an exit pupil shown in FIG. 2. The collimated beam, R, used during the transmission recording of each array element is positioned where the collimated beam appears on playback. In other words, each hologram is recorded in an arrangement that is just the reverse of playback with respect to the diverging and collimated beams in the playback situation.

Preparation of a dichromated gelatin plate is standard practice, and processing of the exposed dichromated gelatin hologram plate is also standard practice. See "Holographic Optical Element for Visual Display Applications" by D. G. McCauley, et al., *Applied Optics*, 12, 232 (1973).

Since it is desirable for the holographic lens to have greater than 90% diffraction efficiency, the material must be capable of recording a thick (volume) and phase-modulated hologram. The theoretical maximum diffraction efficiencies for thin amplitude and thin phase holograms are 6.25% and 33.9%, respectively, whereas thick phase holograms can achieve up to 100% efficiency.

The geometrical constraints of the head-up display system determine both the maximum allowable film thickness and minimum refractive index change in the material, since these factors have a direct bearing on a hologram's angular selectivity. Typically, a ±3° field coverage is required from each element of a hologram array for display purposes to cover the desired field with an adequate number of elements. The following equation is useful to calculate the film thickness necessary to satisfy this condition, $$\Delta \theta = \frac{K \lambda}{2 d n \sin \theta} \tag{27}$$

where $\Delta \theta_R = 3°$, the angle of half-width at half-maximum reflection, $K \approx 3$, a factor determined experimentally from dichromated gelatin holograms, $\lambda$ is the light wavelength, d is film thickness, $n \approx 1.5$, the refractive index, and $\theta \approx 30°$, the angle between the normal to the hologram plane at the point of reflection and either the incoming or reflected rays. Performing the substitutions, the maximum allowable film thickness becomes approximately 25 $\mu$m.

For a phase hologram, the film thickness dictates the minimum refractive index change necessary to develop a given diffraction efficiency. The following equation is used for a reflection hologram.

$$\eta = \tan h^2 \frac{\pi \Delta n d}{\lambda \cos \theta} \tag{28}$$

Substituting the value $n = 90\%$, the diffraction efficiency, and solving for $\Delta n$, the required index change, a value of 0.0127 is obtained.

The thickness and index change requirements can be somewhat relaxed by modifying the array geometry (e.g., making $\theta$ smaller), but large deviations from the thickness or index limit can only be made by sacrificing efficiency or angular response of the holographic lens.

Presently, many materials exist in which holograms can be recorded, but of these only a few can be seriously considered for the present application. The criterion of a thick phase material immediately disqualifies the bulk of holographic materials, such as silver halide emulsions (conventional development), thermoplastic zerography materials, transient photochromics, etched photoresists, kinoform materials, and magneto-optic materials. The remaining materials which may be considered are roughly grouped in classes in the following table where most of their important characteristics are listed.

TABLE I

PHASE HOLOGRAPHIC MATERIALS AND PROPERTIES

| MATERIAL | REFRACTIVE INDEX CHANGE (×.01) | DIFFRACTION EFFICIENCY (%) | TYPICAL EXPOSURE (mT/cm$^2$) | RESOLUTION (cycles/mm) |
| --- | --- | --- | --- | --- |
| 1. Photopolymers | | | | |
|   a. Ba Acrylate | 1.0 | 45 | 0.6 | 3000 |
|   b. Optical Cement | 0.5 | 98 | 8200 | >5000 |
|   c. Dye Sensitized Photoresist | — | 10 | 10000 | >4000 |
| 2. Direct Optical Effect Materials | | | | |
|   a. Lithium Niobate | 0.004 | 40 | 10$^5$ | 4000 |
|   b. Arsenic Sulfer Glass | — | 18 | 9000 | — |
| 3. Gelatin Systems | | | | |
|   a. Bleached Silver Halide Emulsions | 2.0 | 64 | 0.11 | >2000 |
|   b. Dye-Alcohol Sensitized Gelatin | — | — | — | >4000 |
|   c. Dichromated Gelatin | 2.0 | >90 | 30 | 6000 |
|   d. Dye Sensitized Dichromated Gelatin | 2.0 | >50 | 2000 | >4000 |

The first example of a photopolymer, barium acrylate, is not regarded to be satisfactory in resolution and high diffraction efficiency. Moreover, it has stability and environmental disadvantages. Therefore, it is not recommended for use in its present form.

It has recently been shown that commercially available optical cements can be dye-sensitized and used to fabricate high-efficiency, low-noise thick phase holograms. When considering the current application, two major disadvantages become apparent: index changes of only 0.005 have been realized and several J/cm$^2$ are required to achieve diffraction efficiencies of 90% in the reported composition. However, favorable material characteristics of low noise, high resolution, self-development and good environmental stability otherwise recommend this material.

Recent work has shown that dye-sensitized photoresist, a polyvinyl cinnamate compound, is capable of recording reflection phase holograms with He-Ne laser light. However, due to the recency of the development, little quantitative data is available.

The two examples of direct optical effect materials, lithium niobate and arsenic sulfur glass, offer several material deficiencies, which are typical of this class of materials. Very large exposures are required, only small index changes can be achieved and reported maximum diffraction efficiencies are far from the required 90% level. Furthermore, many of these materials form holograms that are adversely affected by exposure to visible light. There are also fabrication difficulties for the crystal or quasi-crystal materials in forming a large head-up display. Therefore, direct optical effect materials are not recommended for use in their present form. They have been included in Table I for the sake of completeness. As a class of thick phase holographic materials, the gelatin systems offer the most promise in the current application. Both obtainable index changes and resolution are well within the required limits.

With bleached silver halide emulsions, 64% efficiency can be achieved in 18 μm thick films for two beam holograms, and it is believed that higher efficiencies can be accomplished by increased film thickness. The primary disadvantage of this material lies in the film thickness decrease upon plate processing. It has been found that the Kodak 649F emulsion typically shrinks 15 to 18% after fixing and drying due to removal of material from the film in the processing. This means that the reflection hologram fringe would make a corresponding wavelength shift. For example, a hologram recorded at 632.8 nm would change its peak reflection wavelength to about 530 nm after processing. Glycerol or triethanolamine have been used to control the shrinkage of the emulsion to eliminate color shift, but this process tends to make the bleach products less stable and darken with exposure to light. Because of these problems, this shrink control technique is not an acceptable approach. It would be better to simply allow for the shrinkage in making the hologram array.

Dye-alcohol sensitized gelatin, has red light sensitivity, resolution >4,000 cycles/mm, and grating permanence upon development after exposure. However, as is the case with dye-sensitized photoresist, little quantitative data is available on this material.

Dichromated gelatin is the best available material for the present application. This material has proved very successful in single element holograms, operating in the green spectral region. Its spectral sensitivity is limited to blue and green light, and the longest exposure wavelength is restricted to about 520 nm. The final material in Table I dye-sensitized dichromated gelatin, can be used for systems requiring material response at longer wavelengths. Its properties are very similar to those of normal dichromated gelatin.

As shown in a graph of spectral efficiency in FIG. 10, dichromated gelatin is capable of a high optical efficiency, small dichroic effects, and low scattering, all of which are desirable characteristics for display applications. Consequently, by using a liquid crystal array as a light modulator to create the image to be displayed, it is a simple matter to select a light source of high brightness, high efficiency in the narrow operating bandwidth of the holographic lens. However, assuming other factors dictate a particular light source for the image, such as a particular CRT, it is possible to adapt the holographic lens to the light source. For example, dichromated gelatin is insensitive at the wavelength of phosophor emission at 547 nm; this requires exposures to be made with an argon ion laser at 514.5 nm, or at 488 nm, but with proper processing techniques it is possible to expand the gelatin layer so that the response is shifted toward longer wavelengths. Therefore, if phosphor emission at 547 nm is to be used for the display image source, exposure can be made at 514.5 nm if the gelatin layer is thereafter expanded to shift the holographic lens response to 547 nm. Expanding the gelatin layer is accomplished by control of the water retained during the processing, i.e., by control of the drying time. (See McCauley, *supra*.)

A test procedure for evaluating the holographic lens will now be described with reference to FIGS. 11a and 11b. The processed holographic lens is held in a suitable mount (not shown). A transparency 28 of a grid pattern is positioned in the plane of diverging beam point source locations used to form the lens array and illuminated by a beam of narrow band ($\sim$ 100 A) light within the reflectivity peak of the array. A low power telescope 29 with an objective aperture size approximately equal to L, the size of the array elements, is used to view the array of hologram elements. The telescope is mounted in a gimbal mount 29', which allows the telescope to be pivoted about the center of its objective. This pivot point also coincides with the location of the pivot point I (relative to the array) in the array forming apparatus (see FIG. 7). The telescope is focused at infinity.

The evaluation procedure is as follows. The telescope is oriented via its gimbal mount, to be directed toward the intersection of two hologram elements in the array, corresponding to one of the diverging beam point source incremental displacements of FIG. 9. The projected aperture of the telescope will then lie on the two hologram elements of interest, as indicated in FIG. 11b for elements (1,0) and (2,0). The field of view of the telescope includes the images of a vertical line (or horizontal line as required) in the grid pattern of the transparency, as formed by the two elements of interest. The angular displacement $\Delta\phi$ (if any) of these two images can be observed. Furthermore, by alternately covering the two elements of interest in the array, the corresponding images can be identified and the direction of the displacement can be ascertained.

The set of angular errors $\Delta\phi$, one for each of the incremental displacements of FIG. 9, can be corrected by adding corrections to the incremental displacements calculated using the discussion set forth hereinbefore of point 2 in the brief outline given first. The corrections, $\delta$, are calculated by multiplying $\Delta\phi$ in radians by the average of $f_j$ for the two elements of interest, where the $f_j$ are given by Equation (22). For example, $\delta_{12}=\Delta\phi_{12}(f_1+f_2)/2$ is the correction to $l_{12}$ of FIG. 9, corresponding to elements (1,0) and (2,0). If the image formed by the element farther away from the center of the array appears nearer to (farther from) the line between points I and Q referred to in connection with FIG. 7 (projected to infinity) than the image formed by the element nearer to the center of the array, the corresponding incremental displacement is decreased (increased) by the amount of the correction. For example, if the image due to (2,0) appears outside the image due to (1,0) (relative to the line between points I and Q), $l_{12}$ is increased by $\delta_{12}$.

After an array has been formed with angular errors $\Delta\phi$ within the system requirements, this array is ready for use in the display system illustrated schematically in FIG. 2. The holographic combiner/lens 20 is the corrected hologram array.

The wavelength for the source of light is selected to have a narrow band matching the spectral efficiency of the hologram material, such as shown in FIG. 10 for dichromated gelatin. To the rest of the spectrum, the hologram array acts as a clear glass. Consequently, the pilot is able to look through the holographic lens at a distant scene and see a focused image from the liquid crystal array superimposed on the scene. In that manner, the holographic lens functions as a combiner. The optics for the head-up display are thus entirely contained in the combiner, except for a relay lens used to magnify the display image. If a sufficiently large liquid crystal display system is used and positioned in the focal plane of the holographic combiner/lens, then all of the head-up display optics will be in the holographic combiner/lens. Consequently, in the embodiment of FIG. 2, the relay lens 25 is simply a lens used solely to project the light image from the liquid crystal display panel to the focal plane 26 of the holographic lens.

Liquid Crystal Image Source

Before describing other embodiments, the liquid crystal image source 21 of FIG. 2 will be described in greater detail. Liquid crystal is the popular name for a material displaying some characteristics of a liquid (relatively low viscosity) and some characteristics of a crystal (molecular ordering). Normal reference to a liquid tacitly means reference to an isotropic liquid — one without molecular ordering or without a determinable orientation axis. Crystalline materials, on the other hand, are generally solids which exhibit definite structural forms (cubic, tetrahedronal) with definite molecular orientation. The liquid crystal mesophase of a material is a state of matter existing between the solid and the isotropic liquid phases. It is this ordering and the mobility of the molecules under the influence of an electric field that is of interest in the field of display technology.

The discovery of the liquid crystal mesophase dates back to 1888 and was observed as a different "turbid liquid" phase occuring during the melting of a cholesterol compound. On cooling, the compound displayed a transition range where incident light was spectrally separated and reflected, exhibiting a behavior similar to a variable density reflective diffraction grating. Since the early discoveries, many different compounds have been identified that exhibit this mesophase between the solid and the isotropic liquid phases. Liquid crystal materials composed of long rigid molecules of a wide variety of chemical compositions have been divided into three classifications: cholesteric, nematic and smectic, depending on the geometric order of the molecular structure. These form regular, ordered orientations due to their physical structure and to their effective electric dipole orientation.

The molecular ordering of the three types of liquid crystals compared with the random orientation of an isotropic liquid in the following manner. In the isotropic liquid, there is no degree of molecular order. In the cholestric mesophase, the molecules are parallel within a thin plane, and the molecules in a plane are held at a particular degree of rotation (long axis) with respect to the molecules in the adjacent planes. The rotation of these molecules, observed as one passes along a line normal to the alignment planes and plots the molecular axis at each plane, can be described as a continuous twist or a helical form. If a sufficient number of planes are passed to arrive at a point where the molecules are parallel to those in the first plane, the distance can be identified as the period of the helix. This period is within (or close to) the wavelength of visible light for materials of interest. The optical effects of this pattern and the effects of electric fields on the pattern are discussed below. In the nematic mesophase the molecules are ordered to the extent that the long axes are parallel. In the smectic mesophase, the molecules are all parallel and are further restricted to discrete planes normal to the long molecular axis. The smectic mesophase is of the least interest for controllable optical qualities.

In any liquid crystal material, it is necessary that an electric dipole exists with the molecule if electrooptical properties are to exist. The material is said to exhibit positive dielectric anisotropy if the major component of the dipole is parallel to the long axis of the molecule and exhibits negative anisotropy if the major component is perpendicular to the molecular axis.

The application of an electric field across the liquid crystal film reorients the molecular axis and aligns the dipole axis with the electric field. In the nematic materials, the reorientation has the effect of forming small domains of molecules where the molecular axes are parallel. From one domain to another, there are variations in the axial alignment due to the rotational position of the molecule (about its major axis) and subsequent variations in the dipole position before application of the electric field. The anisotropy of the liquid crystal material causes local variations in the index of refraction between these domains which form in volumes with dimensions of a few microns. In some applications, the field effect of the local rotation of the molecule achieves the desired optical results by modulation of light refraction or polarization qualities.

Figure 12:
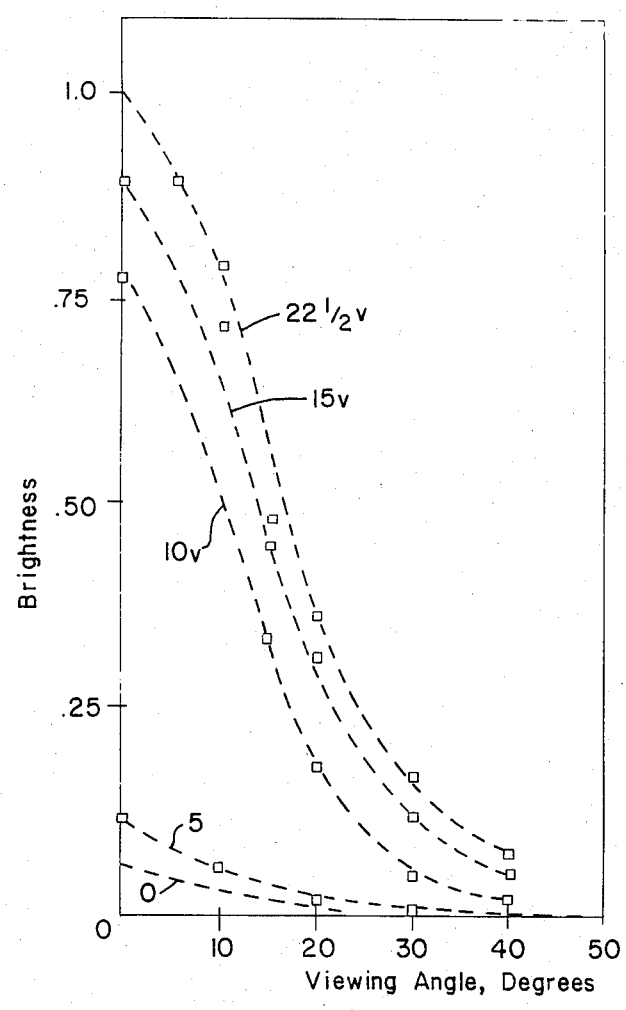
FIG. 12 presents an indication of the light modulation properties of a typical liquid crystal formulation.

In the majority of liquid crystal applications, a secondary effect is created as follows. If the electric field is greater than some threshold critical field, ionic current flow takes place and the domains are moved by the physical interference and the interaction of the field associated with the ions in motion. This effect is called hydrodynamic turbulence. As light is projected through material in this turbulent state, it is scattered by the multiple refractions at the domain boundaries. It is important to note that this scattering is proportional to the current through the material; consequently, this mode of operation is suitable for the presentation of a range of gray shades for the display of sensor video. An indication of the light modulation properties of a typical liquid crystal formation is presented in FIG. 12. This family of curves indicates that a reflective liquid crystal cell has a background luminance of approximately 0.05 (arbitrary units, since the cell merely scatters a portion of the incident light under excitation), and a monotonically increasing brightness (scattering of light) with applied voltage at all viewing angles. The actual gray shade rendition is a function of the contrast requirement and incident light.

In cholesteric materials, the reorientation has the effect of modifying the helical pitch of the planes of molecules. Depending on the original orientation of the helix and the relative direction of the electric field vector, the helix may be stretched or compressed, or the structure may undergo a phase transformation, i.e., to a nematic or an isotropic phase. The original conditions are controllable and repeatable.

Transmissive and reflective cells are identified with the placement of the light source and the observer. A cell is transmissive if viewed from the side opposite the light source. A cell is reflective if viewed from the same side as the light source, regardless of whether the cell is inherently reflective due to the liquid crystal material characteristics or whether an internal mirror or an external mirror is used. Therefore, a cell is reflective if it is used in that manner, and certain cells can be used either way if a partially reflective mirror is used.

A field effect device, as opposed to a dynamic scattering device, is one that uses the realignment of the molecules and the resultant change in optical transmission for information display. One factor is common to all field effect displays. The liquid crystal material must be of much higher purity to reduce any current flow and subsequent turbulence causing dynamic scattering. The bulk resistivities of the field effect material and of the dynamic scattering material are approximately $10^{13}$ ohm-cm and $10^{10}$ ohm-cm, respectively. A typical nematic field effect device is fabricated by mechanically polishing in one direction the transparent conductive coatings used for the electrical contacts. A liquid crystal material with positive dielectric anisotropy is used, and the molecules will align themselves with the abrasion marks left by polishing these surfaces. The cell is assembled with these abrasion marks orthogonal to one another, causing the molecules to form a 90° helix in the direction normal to the surface (corresponding to the stable state of the liquid crystal material in the cell). This cell is placed between two (parallel) polarizing filters.

In operation, incident light is polarized by one filter, rotated 90° by the liquid crystal cell, and absorbed by the second polarizer. An electric field applied to the liquid crystal cell causes the molecules to rotate such that the major axis is perpendicular to the surface. Since this causes the helix to disappear, the light is no longer rotated and is transmitted through the second polarizer. The applied field thus modulates the degree of rotation of polarized light through the cell. This field effect cell has the disadvantage that it must be transmissive cell, since a reflection on the back surface would simply cause the light to be rotated through the liquid crystal again.

A similar device can be fabricated for a reflective system as follows. The conductive coatings are etched and treated such that a liquid crystal material with negative dielectric anisotropy can be placed in the cell, and the molecules will be oriented perpendicular to the surface. The lower surface is a reflector, and the upper surface is covered by a circular polarizer. In this case, an applied field rotates the molecules away from the optic axis. The birefringence of the crystal causes the linearly polarized light to become elliptically polarized, and light is reflected through the cell where it was blocked in the absence of an electric field. In general, the transition in these devices is fairly abrupt, making it difficult to control gray scales, and in the case of the reflective cell, the circular polarizer is wavelength sensitive.

Cholesteric materials can be used in transmissive or reflective cells and are normally used in the field effect mode. The basic mechanism of the electro-optic effect has been described as a modification of the helix pitch of the material. A cell may be constructed such that light incident at the Bragg angle is reflected with the angle of reflection a function of the helix pitch and consequently the applied field. The reflection is wavelength sensitive, but this does not represent a problem since the operative bandwidth of the holographic lens is limited. Utilization of this type of cell for pictorial (gray scale) information requires the positional control of the exit cone of light and allows the exit pupil to be completely or partially filled by the exit cone. Slightly different preparation of the cell causes the liquid crystal to orient differently in the relaxed states, and the cell can be used as a transmissive device.

One known problem area is the temperature sensitivity of the helix pitch. Although certain materials are less sensitive than others, in general the temperature cannot vary more than a few degrees without passing through the same range as that intended for the control range. However, control functions can be included for temperature control of the display or for a bias voltage to counteract the temperature effects.

Most liquid crystal applications have been for digital displays, i.e., data displays without gray scale content. Studies relating to pictorial displays with gray scale have been centered on the dynamic scattering mode of operation of nematic liquid crystals. The preferred choice of a material for the present head-up display system is the nematic liquid crystal because of its more advanced research state. The following table shows a summary of three cell designs and a condensed set of operating conditions.

TABLE II

| TYPE OF LIQUID CRYSTAL | MECHANISM OF LIGHT MODULATION | LIGHTING REQUIRED | ADDITIONAL OPTICAL ELEMENTS REQUIRED |
|---|---|---|---|
| NEMATIC DYNAMIC SCATTERING | HYDRO-DYNAMIC TURBULENCE | HIGHLY COLLIMATED | APERTURE AND FIELD LENS |
| NEMATIC FIELD EFFECT | POLARIZATION ROTATION OR DEPOLARIZATION | DIFFUSED AND POLARIZED | POLARIZER |
| CHOLESTERIC FIELD EFFECT | BRAGG EFFECT INTERFERENCE | SLIGHTLY COLLIMATED | DIFFUSER POSSIBLE |

The manner in which a liquid crystal material is used in this application will now be described. Briefly, the liquid crystal display achieves the area light modulation to provide symbol or video display. It employs a matrix (784 × 1024) of light modulation in either a reflective mode, as shown in the embodiment of FIG. 2, or in a transmissive mode, as will be shown in other embodiments. A large scale integrated (LSI) circuit provides the necessary drive corresponding to the CRT drive system 11 in the prior art head-up display shown in FIG. 1.

The purpose of the display electronics is to control the potential on each liquid crystal cell electrode so that the potential of each and, hence, the brightness of the display at the location of that electrode corresponds to the intensity commanded by the sensor at that point in the scene being presented. The electronics must provide the addressing and multiplexing functions required for the liquid crystal array, using circuits that can be fabricated economically and reliably in the required quantities and available space.

In conventional television systems, one video channel carries all the pictorial information in a serial analog data format. The camera (sensor) scans the scene from the upper left-hand corner along the top horizontal line of the frame, and then retraces and scans a second horizontal line from left-to-right. One scan from top to bottom of the picture area is defined as one field. A second field is then drawn beginning at the upper left-hand corner and the second set of lines are interlaced between the previous drawn lines. Together these two fields form an interlaced frame of the pictorial information.

Relating this format to the liquid crystal scan format, a serial line of television video data must be converted to a parallel data output format for simultaneous presentation to a row of liquid crystal picture elements. In order to provide a display with 1-mrad resolution over a 45° × 60° field of view, the matrix display must contain approximately 750 × 1000 picture elements. For the use of binary logic, 768 vertical by 1024 horizontal picture elements can be chosen. At a 30 Hz frame rate, the active line period is 40 $\mu$sec.

Figure 13:
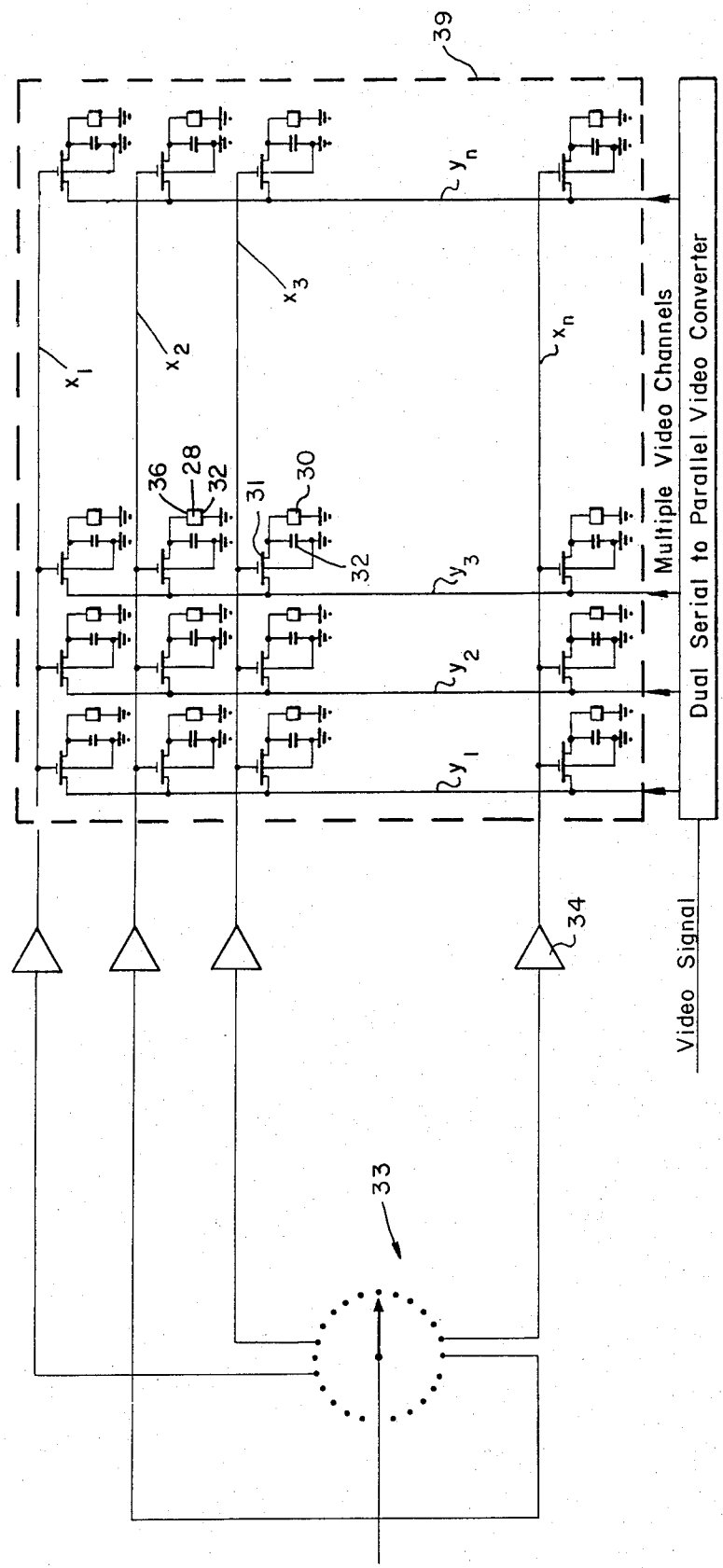
FIG. 13 is a schematic diagram of a liquid crystal display system.

A schematic diagram of the liquid crystal display system is shown in FIG. 13. There is a picture element at each intersection of row ($X_i$) and column ($Y_i$) conductors. A typical element is comprised of a liquid crystal cell 30, which may be characterized by a small capacitance and a high leakage resistance in parallel, a field effect transistor (FET) 31, and a monolythic capacitor 32. Together, these parts constitute an elemental sample and hold circuit to stretch 40 microsecond addressing pulses to the millisecond lengths needed to energize the liquid crystal material. The cells are arrayed in the display panel and illuminated with collimated light from a source preferably having high brightness and high efficiency (a peak) in the band of wavelengths within the operating bandwidth of the holographic lens. The conductors on the back of the cells are reflective for use of the display system in the reflecting mode, i.e., for use with unmodulated light entering the front of the panel of cells and modulated light emerging from the front of the panel. However, for a transmissive liquid crystal display, the conductors on the back side of the cells are transparent like the conductors on the front side. The source of collimated light which illuminates the panel of cells is then placed on the back side of the panel of cells.

Each FET is of the correct polarity (p-channel) and is connected so that when the gate is driven negative, the FET is turned on and the elemental capacitor is connected to its corresponding column conductor. Conversely, when the gate drive is removed (the gate voltage returns to zero or becomes positive), all elemental capacitors in the corresponding row are disconnected from the column conductors by the high FET off resistance. In this manner, each of the elemental capacitors in any column is separated from the other capacitors in that column. Because the gates of all the FETs in any row, i, are connected by the gate-electrode conductor, $X_i$, an enable signal on any gate-electrode conductor causes all the elemental storage capacitors in that row to be charged to the video level that is present on the corresponding column-electrode conductor.

The circuit required to perform the sequential scan of the gate-row conductors consists of a multiplexer 33 or a ring counter and a driver for each line of the display. Note that during one half cycle of the multiplexer the odd rows are energized, and during the next half cycle, the even rows are energized. This is to achieve a 2:1 field/frame interlace as in conventional television display. When a 768-line display is being refreshed 30 times per second, the basic clock rate of the multiplexer is 768 × 30, or approximately 23 kilohertz.

Figure 14:
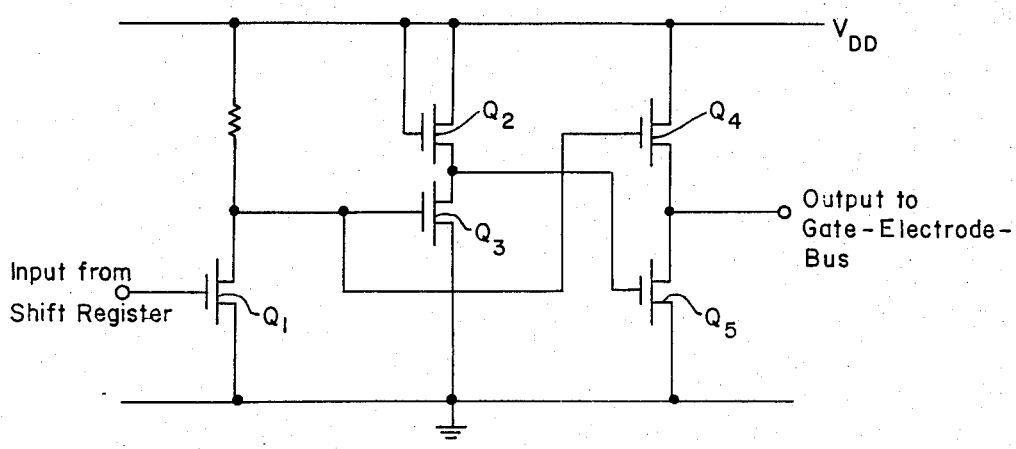
FIG. 14 is a schematic diagram of a sweep drive amplifier for the system of FIG. 13.

For the present exemplary embodiments, the liquid crystal display uses the dynamic scattering mode of the liquid crystal material. Therefore, the video signal must be approximately 20 volts to excite the liquid crystal to its maximum scattering condition (maximum brightness). The threshold voltage of the FET transistors is 4 volts, resulting in a gate voltage drive requirement of 24 volts. Because the output voltage level of the multiplexer 33 is 3 to 4 volts, a buffer amplifier 34 is employed to provide the load isolation and the voltage gain. The amplifier must have the 24-volt output voltage swing with sufficiently high gainbandwidth product and power drive capability to provide a good line drive pulse. Deterioration of this pulse shape causes smearing of the image between two adjacent vertical elements, because one row gate is not completely off before the succeeding row gate begins to turn on. One such amplifier consisting of field effect transistors $Q_1$-$Q_5$ is shown in FIG. 14. This amplifier has a slew rate of approximately 10 volts per microsecond when loaded with the characteristic row conductor capacitance of 300 picofarads.

At the time when a gate pulse addresses a given display row conductor, the video voltage corresponding to each picture element on that line must be present on each appropriate column conductor. A dual serial to parallel video converter 35 which includes set of 1024 sample and hold circuits is required to convert the serial video signal corresponding to one diagram of such sample and hole circuits in two banks 41 and 42 driven by respective shift registers 43 and 44, each corresponding to one line scan. Two identical circuits are used in order that one circuit can drive the display as the other is storing the succeeding line of video under control of a flip-flop 45. The Q and Q outputs of the flip-flop connects either set of sample and hold circuits to drive amplifiers 46 through corresponding sets of FET latching switches 47 and 48 to provide the input to the column drive conductors of the liquid crystal display system.

The flip-flop 45 is switched at the end of each video data line by horizontal synchronizing pulses from a video source 50. NAND gates 51 and 52 are alternately enabled by the flip-flop to transmit picture element clock pulses (1024 pulses properly spaced) from a generator 53 which is synchronized by the horizontal synchronizing pulses.

Each shift register functions as a ring counter in that shift pulses from the gates 51 and 52 shift a single bit 1 in at one end and out at the other when selected, thus sampling the video at successive periods of one horizontal synchronizing cycle and storing the sampled video in capacitors. Each sample-and-hold section consists of a sampling FET switch 55 and holding capacitor 56. The gate of the sampling switch is connected to the shift register through a drive amplifier 57. Note that the shift register 44 is operated by the Q output of the flip-flop while the latch switches 47 are turned on, and that the shift register 43 is operated by the Q output of the flip-flop while the latch switches 48 are turned on.

The drive amplifiers 46 are designed to have high input impedance in order that the holding capacitors will not discharge significantly while their latching FET switches are turned on. Once a sample FET switch 55 is turned on, the associated holding capacitor charges, or discharges to the level of the video input. This requires bilateral conduction through the sampling switches. To avoid that, the holding capacitors may be cleared at the beginning of the line sampling operation through a separate switch turned on before a bit 1 is shifted into the first stage of the shift register.

For the embodiment illustrated in FIG. 2, the liquid crystal display employed in the reflecting mode is formed by sandwiching a thin layer of liquid crystal material between a glass plate, with a transparent (thin film) sheet conductor on the inside surface, and a semiconductor back plate with a matrix (array) of reflecting conductors. The semiconductor that forms the backing plate also contains the individual cell addressing circuitry.

The front transparent conductor is formed by depositing a very thin layer of indium oxide or similar type material, on the inside surface of an optically flat glass plate. That conductor is used as circuit ground for the circuitry in the dotted line block 39 of FIG. 13, i.e., as circuit ground for the coil selecting circuitry. That circuit ground plane is in turn AC grounded to the aircraft and therefore also provides a radio frequency interference shield for the display.

The liquid crystal material fills a void formed by a set of spacers between the front glass plate and the back plate. The same liquid crystal material is common to all cells in the display. That does not interfere with the operation of the display because its high viscosity prevents the scattering centers from migrating significantly once they are formed in one cell.

Figure 15:
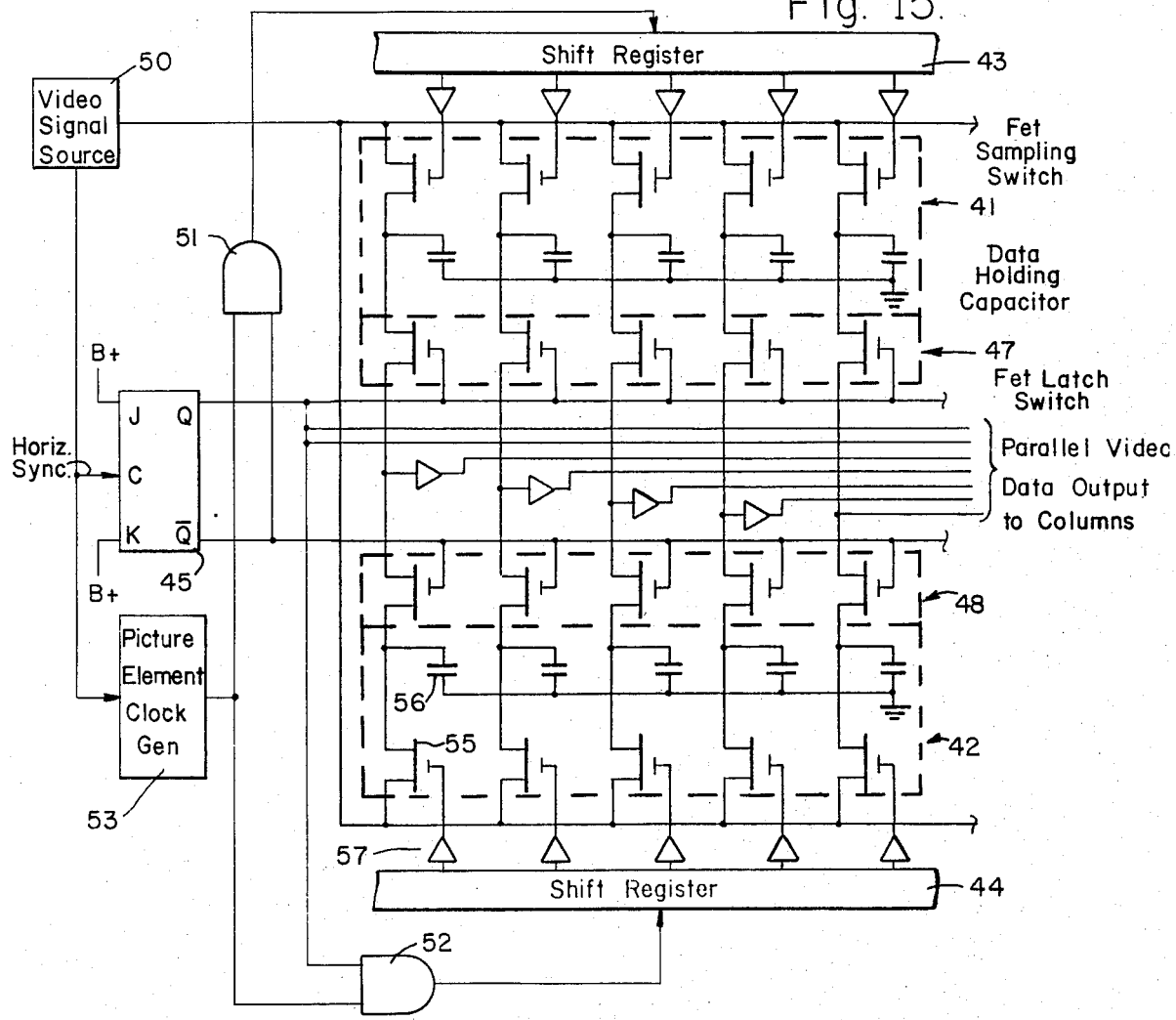
FIG. 15 is a schematic diagram of a serial-to-parallel video signal converter for the system of FIG. 13.

The array of cells is scanned in a manner such that each of the cells is addressed sequentially, a row at a time, and from left to right within a row. Each row is enabled, in turn, by the application of a negative voltage (assuming p-channel enhancement FET switches 31) to the given row conductor $X_i$. A cell within a row is activated by placing the positive going video signal on a conductor $Y_j$. The video signal is switched to all the column conductors sequentially, as described with reference to FIG. 15. In this manner all the elements are sequentially scanned in a fashion analogous to conventional television scanning.

With the liquid crystal materials presently available, there is approximately a 5 millisecond delay (with an applied potential of 20 volts) between when the field is applied across an individual liquid crystal cell and the formation of the scattering centers within the cell. This 5 millisecond delay may be though of as an image developing time. Once these scattering centers are formed, they will remain for a period of approximately 30 milliseconds. If the display is refreshed at a 30 Hz rate, then the individual cells will be addressed every 33.3 milliseconds, and a new set of scattering centers will be formed almost immediately after the previous set has decayed. This scattering, center decay is analogous to phosphor persistence in a conventional cathode ray type.

Figure 16C:
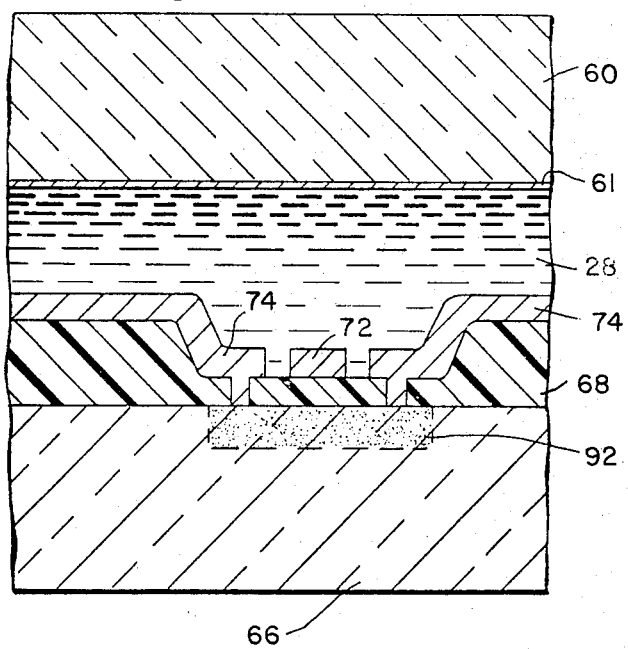
Figure 16A:
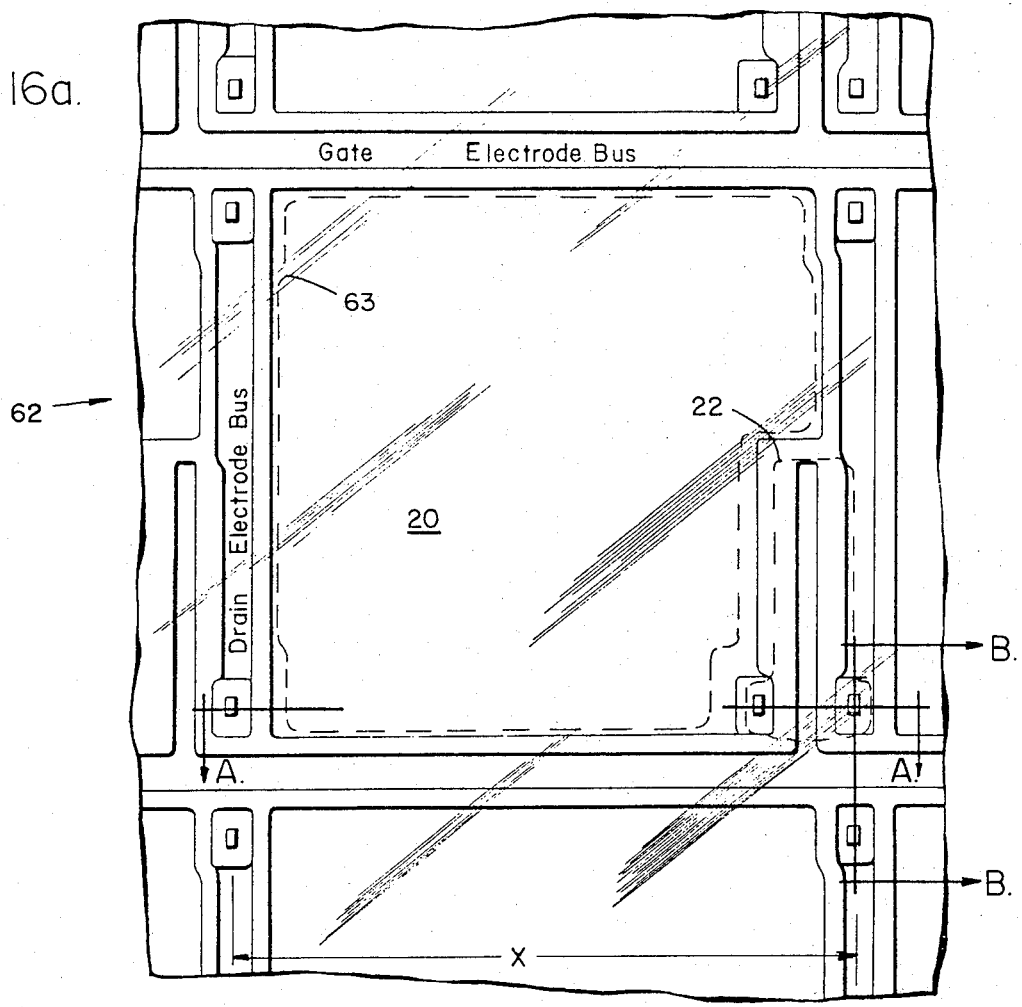
Figure 16B:
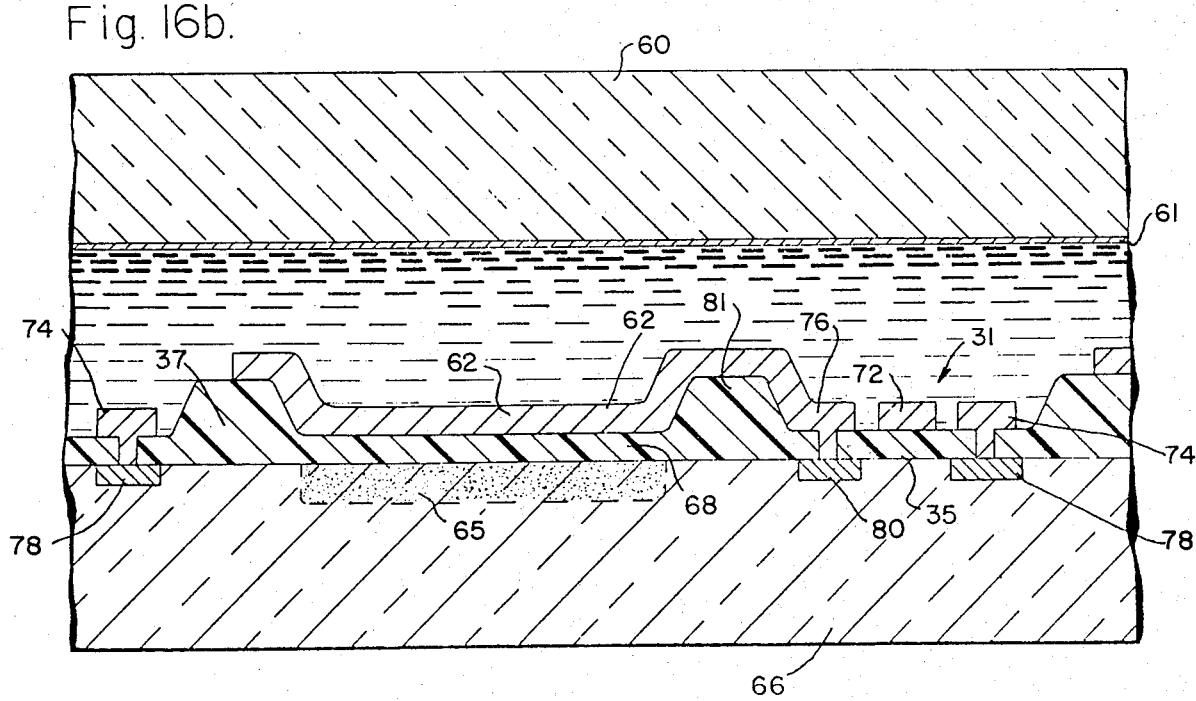

The semiconductor back plate contains the cell addressing circuitry and the individual liquid crystal cell contact electrodes. It is formed from a single wafer of semiconductor material, preferably silicon. FIG. 16a shows a top view of one cell of the back plate, i.e., the topology of the circuitry forming one cell, and FIGS. 16b and 16c show cross sections closing lines A—A and B—B of FIG. 16a, respectively. In a matrix array of 100 × 100 elements there would be 10,000 identical cells of the type shown. The individual circuit components are formed by successive ion implantation operations and metalizations. These processes permit very precise control of the depth and area of semiconductor doping and therefore make possible the required large scale component fabrication with a minimum of defects.

Any suitable liquid crystal material may be used in the panels of the subject invention. For example, N-(p-methoxy-benzlidene)-p-n-butylaniline (MBBA) is a widely used nematic liquid crystal having an acceptable operational temperature range. It has been found that good dynamic scattering mode (DSM) characteristics are obtained from MBBA material containing 2.3% cholestone and 1% of a zwitterion dopant.

FIG. 16a, to which reference is now primarily directed, shows an enlarged view of one elemental cell and portions of contiguous cells. What is seen in FIG. 16a through the front glass plate 60 and transparent conductor 61 (FIG. 16b) is the topology of the large scale integrated (LSI) circuit on the back plate for one cell. The reflective conductor 62 which contacts the liquid crystal material may be aluminum, nickel, chromium, gold, or silver deposited by standard evaporation or sputtering techniques.

The boundary of the cell capacitor 32 (FIG. 13), which is formed beneath the reflective conductor 62 is depicted by a closed dotted line curve 63 on FIG. 18a. It should be noted that the cell shown in FIG. 16a is greatly magnified, such as 400 times actual size, and that FIGS. 16b and 16c are not necessarily to scale, as portions thereof have been altered to improve the clarity of the illustrations. To provide an indication of the actual scale of liquid crystal display cells in accordance with the invention, consider dimensions X between adjacent column conductors in FIG. 16a to be 10 mils, for example.

Referring now to FIG. 16b, the capacitor 32 is comprised of conductor 62 separated from an n+ doped region 65 (grounded) on a silicon substrate 66 by a dielectric layer 68. The dielectric layer may be silicon dioxide ($SiO_2$) or silicon nitride ($Si_3N_4$) or combination of both. The reflective conductor 62, dielectric layer 68 and the n+ doped region 65 may be 8000A, 1200A, and 2000A, respectively, in thickness. It is noted that without the n+ region formed in the silicon substrate 65, capacitance is very much dependent on the applied voltage. This voltage dependence is undesirable since the storage time would also be a function of the applied voltage. The heavily doped n+ region 65 makes the capacitance substantially voltage independent.

The p-channel, enhancement-type field-effect transistor 31 shown in FIG. 13 is comprised of gate 72, drain 74, and source 76 contacts. Drain and source regions 78 and 80, respectively, are formed as p+ regions in the silicon substrate 66. It should be noted that the reflective conductor 62 is in physical contact with the source contact 76 over a ridge 81 in the dielectric layer 68.

The structure for forming the drain contact 64 as part of the column select conductor of the liquid crystal display matrix such that it passes beneath the gate contact formed as part of a continuous row select conductor illustrated in greater detail in FIG. 16c. As there shown, a p+ doped region 92 allows for the continuity of the drain contact 74 under the gate contact 72. The junction between the region 92 and the substrate 66 provides a back biased PN junction for isolation between the drain contact and the silicon substrate.

The space between the glass plate 60 coated with the transparent film 61 and the back plate is filled with liquid crystal material. The back plate may be fabricated by using the following standard metal-oxide-silicon (MOS) processing steps:

1. An oxide is grown to the greatest thickness required (e.g., see region 87 of FIG. 16b).
2. Holes are etched for the n+ diffusion using standard photoresist and etching techniques.
3. The n+ regions are formed by diffusion.
4. Holes are opened for the p-diffusions.
5. The p-regions are formed by standard diffusion techniques.
6. The thick oxide is removed from the areas which will be thin oxide (e.g., region 68 of FIG. 15b).
7. The thin oxide is grown.
8. Contact holes to the p-diffusions are opened.
9. Metal is deposited and etched.

The thin oxide for insulating the gate 72 and for the dielectric layer 68 of capacitor 32 may be formed during a single processing step. As illustrated in FIG. 16a, almost all the area is optically active, with a minimum amount taken up by the field effect transistor and addressing conductors because the broad area devoted to the capacitor provides a large proportion of space for reflection of light from the cell.

According to a second method of producing the liquid crystal display, ion implantation rather than diffusion is used to form the n+ doped region 65. Photoresist or metal may be used to protect all areas where ion implantation is undesired. The implantation step may be performed following the growth of the thin oxide, and for p-channel devices, implantation of phosphorous ions is preferred inasmuch as this provides a doped N+ region which is in good contact with the N substrate. Ion implantation has the advantage of being a low temperature doping operation and the dielectric layer 68 of the capacitor can be controlled much better on a substrate area that has not been subjected to a diffusion, and ion implantation allows the doping of the substrate after the dielectric layer has been formed.

The reflective conductor 62 may be formed by depositing a doped polysilicon film rather than a metal film. Although optical characteristics of the polysilicon are inferior to the metals, the polysilicon is easier to deposit, thereby simplifying the precision of the fabrication steps.

From the foregoing description of a liquid crystal display for the head-up display system of FIG. 2, it is evident that each liquid crystal cell is a light modulator. Incident illumination is scattered from the display surface as a function of the electric signal applied to the liquid crystal cell. The head-up display system therefore requires the light source 23 and collimating lens 24 to illuminate the liquid crystal cells, thus generating an image for the holographic lens. The variable light output from each cell on the liquid crystal forms the visual object that is imaged by the holographic lens. This image is seen projected into the external scene by the use of the holographic lens/combiner. The desired characteristics imposed upon the light source by the system are high brightness and high efficiency in the operating bandwidth of the holographic lens, and preferably a narrow spectral bandwidth. The degree of collimation of the light source will depend on the choice of the liquid crystal design parameters.

In the first embodiment of FIG. 2, light from a point source 23 is collimated by a lens 24. However, the light source could be a large area diffused source instead of a point source and collimating lens if a transmissive liquid crystal display is employed.

Luminance and Chrominance Requirements

An analysis of the luminance requirements is presented, based on the luminance/contrast required and estimates of the efficiencies of the optical elements. The chrominance requirements of the source and a comparison of the outside view tinting as seen through the holographic combiner and a dichroic combiner will now be discussed.

Operation of the head-up display system depends on the optical mixing of a display image with the view of the outside. One of the foremost requirements of an advanced system is that the outside view must not be distorted. Distortion includes both geometric and spectral distortion. The use of a multiple element or continuous holographic combiner/lens to minimize geometric distortion was discussed hereinbefore. With the holographic combiner/lens, transmission of illumination from the outside is very high across the visible spectrum, except for the operating bandwidth of the holographic combiner/lens. This narrow rejection band of the holographic combiner/lens results in little loss in illumination from the outside and therefore very little color change in looking through the holographic combiner/lens. An understanding of this advantage is obtained by analyzing the chromaticity diagram shown in FIG. 17 which assumes the holographic combiner/lens is produced with an operating bandwidth of 20A.

Figure 17:
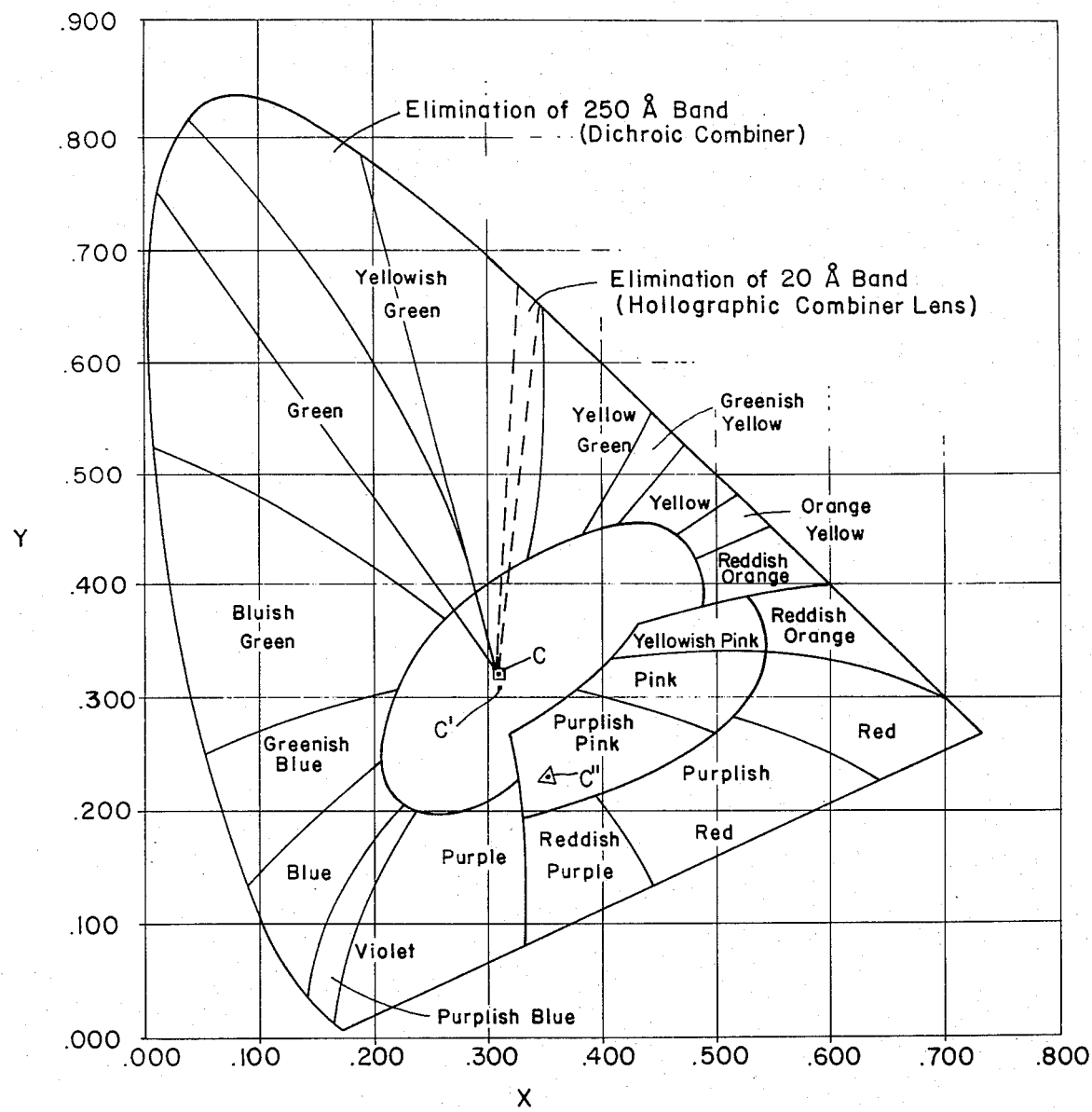
FIG. 17 illustrates in a CIE chromaticity chart the effects of filtering outside light by a dichroic combiner for comparison with the effects of filtering outside light by a holographic combiner/lens in the present invention.

The chromaticity diagram represents all hues and saturations of the visible spectrum plotted at equal luminosity. Any point on the perimeter of the curve represents a pure spectral color (monochromatic radiation) of unit luminance intensity. The resultant color of any mixture of colors can be determined by graphic interpolation inside the boundaries of the chart. The x and y axes of the coordinate system were determined empirically by psychological studies in color matching from three standard color samples. FIG. 17 shows the effect of the removal of a 20A band at 5550A. The peak of visual color response of the eye occurs at 5550A. The removal of such a narrow band of energy produces an effective shift of less than 1% in apparent hue toward the purple area of the diagram (e.g., the shift of the white hue C to the hue C').

For comparison, in a typical dichroic head-up display, the rejection bandwidth may be as high as 250A, as shown in the shaded area around 5250A in FIG. 17. Removal of this spectral band of incoming energy will shift the centroid of the diagram to point C'', corresponding to the magenta hue of a white object viewed through a conventional head-up display with a dichroic combiner. This band is shown centered around 5250A to match the more intense emission peak of the JEDEC registered P31 phosphor. A CRT with this phosphor is typically used in present head-up display systems.

The P31 phosphor is a high output, burn resistant phosphor well suited to the head-up display application. Its output spectrum is so broad, however, that a wide rejection band is required in the combining glass; consequently, the hue of the transmitted image is altered appreciably. The operation of the holographic combiner/lens therefore gives precisely the desired results from the standpoint of minimum chromatic distortion of the outside image while maintaining good reflection qualities in the spectral range containing the symbology.

A source of illumination which excatly matches the operating bandwidth of the holographic combiner/lens is preferred for maximum efficiency with respect to the collimating function of the holographic combiner/lens. However, in practice the holographic combiner/lens may be formed with a wider operating bandwidth between 50A to 100A. The result will then be slightly more tinting of the outside scene, but still significantly less than the tinting produced by a dichroic combiner. An advantage of a wider operating bandwidth for the holographic combiner/lens is that a narrow band light source need not be so precisely tuned as it would have to be for a narrow operating bandwidth.

Ideally, the center wavelength of the spectrum of the symbology should be chosen to closely match the 5550A peak visual acuity of the average eye. At this peak point 5550A, one watt of radiant power is equivalent to 680 lumens. A light source with very high efficiency may be found whose spectrum lies only slightly off the peak of this curve. The product of that light source efficiency and its relative luminosity could be higher than the corresponding product for a source closer to the peak. If this is the case, the higher efficiency light may be more desirable.

It was indicated hereinbefore that a contrast ratio of 1.8 is desired to be able to see display symbols (2 gray shades) at full resolution (1 mrad). Providing such a high contrast will insure the display of legible symbols at lower resolution or with a lower background brightness. Approximately, 80% of the outside ambient brightness is transmitted through the holographic combiner/lens. Using a design goal background ambient at 10K foot-lambert, the symbology must be visible against 8,000 foot-lamberts. Providing a 1.8 contrast ratio means that the display symbol must be at 6,400 foot-lamberts since it adds to the background. The efficiency of the hologram in the narrow band of the collimated symbology is 0.90; therefore, the symbols must be projected at a brightness of 7,100 foot-lambert. The efficiency of the hologram may be slightly different, depending on whether it is used in the transmissive or reflective mode. This difference is not considered significant. The last optical element prior to the liquid crystal display is the relay lens. It collects and magnifies the image to the holographic lens. Assuming 90% efficiency, the light from the liquid crystal display must be 7,400 foot-lambert.

As noted hereinbefore, modulation of the light from the source can be achieved by a reflective or transmissive liquid crystal. In considering the reflective liquid crystal mode, two alternate means of optical processing of the light are possible. These are the specular reflective and scattering modes. The specular reflective mode places the relay lens in the path of reflected light, rather than scattered light, and provides the highest brightness with a less complex optical design. The scattering mode relys on a high collection efficiency in the relay lens. However, the specular reflective mode exhibits lower contrast capability, since some of the scattered light will effectively add to the background. In the scattering mode, the specularly reflected light is either reflected into a light trap, or onto a mirror reflecting it back onto the liquid crystal matrix. This mirror technique adds to the efficiency of the optical system.

The scattering mode with an 80% efficiency has been illustrated in the embodiment of FIG. 2. There the light source must emit 9,900 foot-lamberts of well collimated narrow band light near the peak of visual response (5500A). One factor which may tend to lower this requirement is the contrast enhancement experienced when using monochromatic light (symbols or video) on a broadband background (outside view). Research has indicated that contrast improvements on the order of two to one may be experienced when viewing colored test patterns on a white background over brighter white light test patterns on the same background.

The brightest ambient object considered (a white sunlighted cloud) is very nearly an ideal lambertian source (i.e., the intensity function of the diffused reflection from its surface is defined by the cosine of the angle from the normal to the cloud). The peak luminousness of a lambertian source, defined in lumens per square foot, equals the number of foot-lamberts leaving the surface divided by the value $\pi$. The derived value of source luminance, 9900 foot-lamberts, when attenuated by the optical system, provides the necessary contrast against the 10,000 foot-lambert cloud. An equally valid comparison could have been made with the peak luminousness of the cloud versus the luminousness of the symbols from the hologram. The symbol source luminance of 9900 foot-lamberts corresponds to an equivalent luminousness of 9900/$\pi$ or 3100 lumens per square foot.

The equivalent radiant power at the peak of the visual perception curve is defined as 680 lumens per watt of radiant power. This equivalence is appropriate only in the region of 5550A. At 5100A, the visual sensitivity has decreased to 50%, and the equivalence at this wavelength is 340 lumens per watt. Assuming a source near the peak of the visual preception curve, the radiant exitance is 3100/680 or 4.6 watts/sq. foot. This value is the basis for the required light source power. In the following, the efficiency of possible light source is evaluated to determine those most suitable.

As just noted, the light source must produce approximately 4.6 watts per square foot on the combiner/lens for a source with luminous efficiency near 680 lumens per watt. For a field of view of 60° by 45°, a combiner/lens subtending this angle at a viewing distance of 26 inches will cover an area of approximately 4.5 square feet. Therefore, the light sourse must project approximately 20 watts of radiant energy within a 20A bandwidth to the combiner/lens prior to reductions by the liquid crystal attenuation characteristics (reflective or transmissive) and optical attenuation.

Possible light sources must have high efficiency within a 20A spectral bandwidth. Many possibilities are thus rendered inappropriate. For example, consider a black body radiator. The maximum color temperature attainable with a tungsten filament source. If the energy within a 20A bandwidth at 5550A is compared in a black body radiation spectrum for a temperature of 3800°K with the total radiated energy between the wavelength limits plotted (zero to 50,000A, or 5 microns), the spectral efficiency is found to be 0.03%. This is the efficiency of a tungsten light source with a perfect optical filter of 20A bandwidth. A practical filter would reduce this efficiency by approximately 25% and would consequently require a total input power of 90 kilowatts to an ordinary tungsten light source. This low efficiency is due to the requirements for narrow bandwidth and applies to any black body radiator. It is therefore evident that a black body radiator is not a desirable choice.

A source should be chosen which has a high conversion efficiency specifically in the narrow operating bandwidth of the holographic combiner/lens. As a possible compromise, the bandwidth of the combiner/lens may be made greater than 20A, as noted hereinbefore, but the outside view becomes more tinted if this bandwidth is increased.

Light Sources

The first class of lamps which may be used produces a narrow spectral emission band by gas discharge. A variety of lamps are manufactured to generate narrow spectral bandwidths at various wavelengths. These are glow discharge lamps, called are lamps, which emit a characteristic glow corresponding to the arc discharge characteristics of the element in the cathode. One such lamp with a thallium cathode emits a strong line at 5350A, a wavelength suitable for this application. The 5350A line is near the peak of visual response. Since it is not of the peak of visual response, 22 watts of radiant-energy are required. Arc lamps require low radiated power from the plasma glow, because the lamp must operate at very low cathode currents with a high field at the cathode. As a result, the cathode remains cool, and the primary radiation is at those wavelengths corresponding to the energy bands of the lamp element with the highest transition probabilities. If the cathode current density is increased, secondary effects broaden the emission bandwidth. In general, these effects are collisions, self-adsorption, re-emission, and other heating effects. As the elements are heated, black body radiation effects lower the efficiency and increase the power output to a level usable for this application. At this high level, the gas does not operate in a glow discharge mode with the emission characteristics and cathode field as described above. Instead, it operates in an arc discharge mode.

An abrupt change in line broadening and a rise in the background white light (continuum) takes place in the emission of an arc lamp. Thallium iodide arc lamps have been built recently for narrow band illumination in oceanographic research. Currently manufactured 300-watt lamps are approximately 5% efficient in the required 20A bandwidth at 5350A. Assuming a 5% efficienccy, a 440 watt lamp is required to provide the 22 watts of radiant power. A current limiting power supply is necessary, since the lamp is a negative resistance. Assuming a 75% power supply efficiency, 580 watts of input electrical power are required to provide the required illumination.

The second class of lamps which may be considered includes light emitting diodes, electroluminescent panels, and solid state lasers. Solid state light emitting diodes. (LED) have been manufactured for some time, but no efficient materials have been found for room temperature operation in the 5550A portion of the spectrum. There has been an effort to produce an efficient solid state lamp, but it has met with little success. The best green LED is made from gallium phosphide and has been reported to produce efficiencies of approximately 0.1 to 0.6 percent. The devices are very low power, the nominal power dissipation being less than 0.5 watt. If the entire panel were illuminated with LED power, a large number of devices would be required in an array. With a possible efficiency of 0.4 percent, an input power of 5 kilowatts would be required and 90,000 devices would have to be assembled (and cooled to nominal ambient temperature) to produce this power. Illumination of a portion of the dispaly area at any particucalr time (depending on the symbol being presented at that time) adds complexity to the system and still would not provide a solution for the illumination of the entire panel. Developments which may not be too far into the future may produce an efficient LED.

Electroluminescent panels are radiating devices that are fabricated as a sandwich structure with a phosphorescent material between two electrodes. Radiation takes place as a result of direct electron recombinations in the phosphorescent layer. The process is very inefficient due to the high fields required for ionization. Electroluminescent panels have been manufactured for several years with a lack of success in developing a very bright device. An example of a state-of-the-art device would be an electroluminescent panel consisting of a $Z_nS:Mn$, Cu phosphor panel, operating at 100 Vdc and 2.5 ma/cm$^2$ power input with a 100 foot-lambert output. The conversion efficiency is 0.1%, but the radiated output is in a 500A bandwidth (at a peak wavelength of 5800A). The brightness and efficiency is far below that required for this application but future developments may improve the state-of-the-art in electroluminescence sufficiently for their use in this application.

The light source must provide a conversion efficiency significantly higher than 1%, preferably higher than 10%, to be useful in a head-up display system. Solid state lasers can be considered for this application, since they are more efficient than light emitting diodes or electroluminescent panels. Their operating conditions, however, are not favorable for a practical airborne display. The materials require cooling to cryogenic temperatures to emit the characteristic high energy, narrow band radiation.

For this reason, the solid state laser devices using direct electrical transitions are not considered practical for this application. More conventional laser systems, both gas and crystal, either operate at low efficiencies or at a poor wavelength for the application even though cryogenic cooling is frequently not necessary for their operation. For example, the helium-neon laser operates at room temperature and is a common tool in technology today, but the radiation efficiency is lower than 1% and the radiation wavelength is at 63238A. Operation at this wavelength is unfavorable because of the reduced visual sensitivity in the red spectral region. One potential type of laser that may be eventually developed sufficiently is the liquid dye laser currently under investigation.

Conventional phosphors excited by a high energy electron beam or by an ultraviolet photon beam are another category of light sources. Cathodoluminescene can be generated by a floor of high energy electrons striking a phosphor surface in a vacuum tube (cathode ray tube). The output energy is diffused over a large area and cannot be well collimated. A typical narrow band phosphor suitable for this application is P44, which is a narrow band phosphor emitting in a narrow band between 5400 to 5450A. This phosphor is specified as emitting 200 foot-lamberts at 20KV with 0.5 microamps per square centimeter excitation. The efficiency is 3.3% for the 50A bandwidth. Extrapolating linearly (although the phosphor efficiency actually decreases with increased current loading) to obtain the required 20-watts output in a 20A-bandwidth, the beam power must be 1500 watts. This is clearly unreasonable for a CRT faceplate power loading specification and would require an extremely high emission cathode to generate the beam current of 75 milliamps. The same phosphor can emit radiation under ultraviolet photon excitation.

Photoluminescence is the process of converting photon radiation of one wavelength to photon radiation at another wavelength. The conversion of interest is from the ultraviolet radiation of the mercury arc at 2537A to the photoemission at 5440A. The efficiency of the 2537A source and the conversion efficiency of the phosphor are both very high, but as in any phosphor surface, the disadvantage remains that the radiation is diffused over a large area and cannot be well collimated.

The mercury line power generation and the conversion efficiency are both simple to evaluate with straightforward laboratory experiments. A production device should be relatively inexpensive to fabricate. Mercury arc lamps have been in production for quite some time, and the reported conversion efficiencies (at 2537A) are approximately 90%. The phosphor of interest is a phosphor manufactured by General Electric Chemical Products Selection which carries their catalog number 118-2-34. The chemical compound is $Gd_2O_2S:Tb$. It is specified to have a very intense, high purity peak at 5440A and a close secondary peak at 5485A. Both of these peaks are approximately 25A wide, but the 5440A peak is more intense. The combination of the mercury arc and the phosphor utilizing only the 5440A peak is expected to yield a power conversion of approximately 25%. This is significantly higher than the other sources studied. If it is determined in future studies that the spectral bandwidth can be increased to 75A, the efficiency will be increased to approximately 40%. Since the phosphor surface emits diffused light, the projection system must collect this to project to the holographic lens. Assuming a collection efficiency of 50%, the power requirement is 160 watts. Increasing the bandwidth to 75A, the efficiency will be increased to approximately 40%. Since the phosphor surface emits diffused light, the projection system must collect this to project to the holographic lens. Assuming a collection efficiency of 50%, the power requirement is 160 watts. Increasing the bandwidth to 75A results in a further lowering of required power to 100 watts.

In summary, the two practical lamps for the present invention are the thallium arc lamp for a point source and the mercury arc activated $Gd_2O_2S:Tb$ phosphor panel lamp for a diffused source. Due to the operation of the liquid crystal cell, the optical projection system associated with the reflective liquid crystal cell design requires a collimated light source. Therefore, a point source must be used with a collimating lens. The diffused source appears to be most applicable to the transmissive liquid crystal display of FIG. 17.

Additional Embodiments

Figure 18:
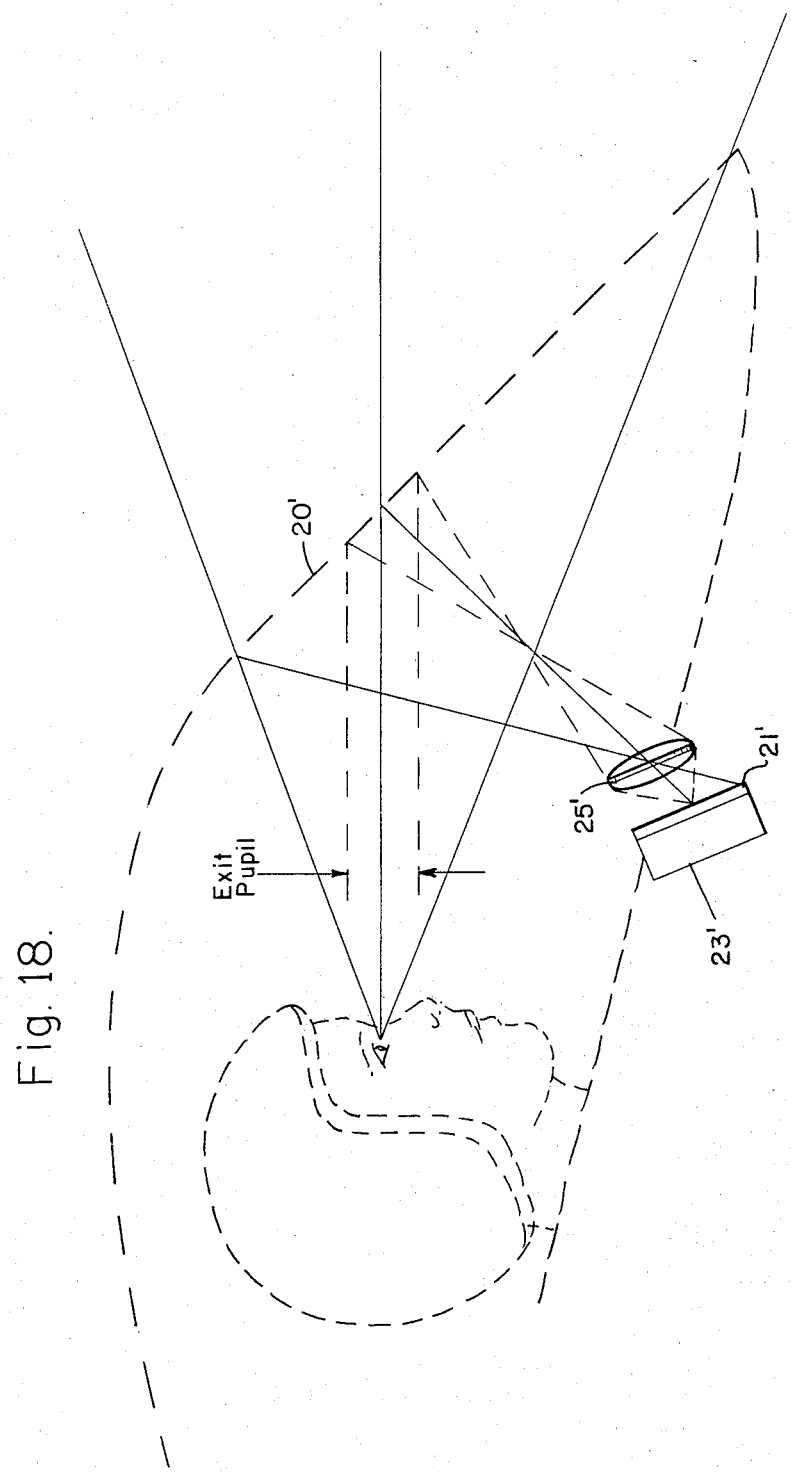
FIG. 18 illustrates a second embodiment of the present invention.

FIG. 18 illustrates a second embodiment which employs a transmissive liquid crystal display 21' in an arrangement which places the holographic combiner/lens 20' on the inside surface of the aircraft canopy. The diffused light source 23' is placed directly behind the liquid crystal display. It is evident that in such a case the display cells must be formed on a transparent substrate using transparent thin film technology for conductors, and transparent dielectric material which is feasible with silicon as the substrate and $SiO_2$ as the dielectric material.

Figure 19:
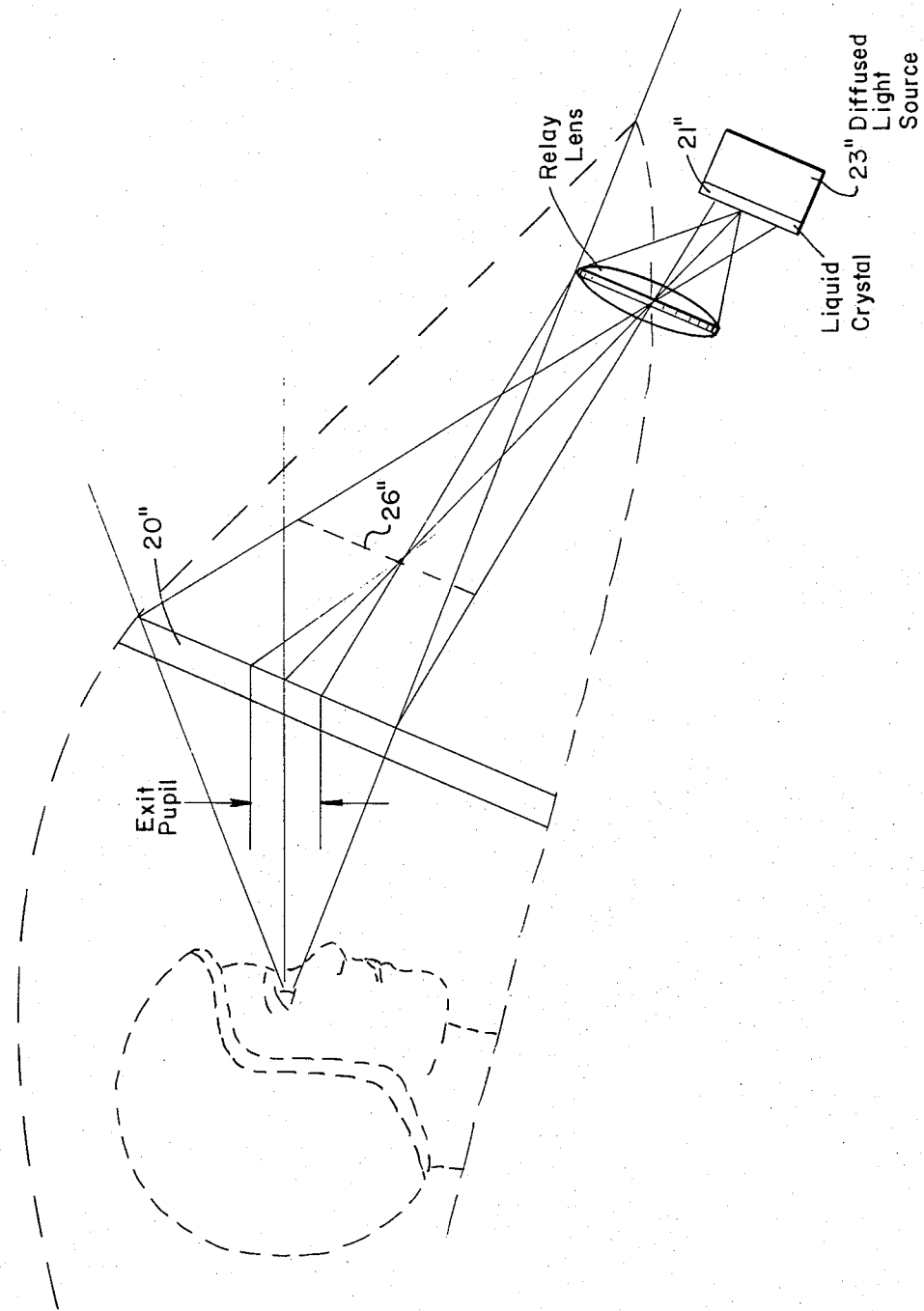
FIG. 19 illustrates a third embodiment of the present invention.

The embodiment of FIG. 2 illustrates the use of a transmissive holographic combiner/lens and a reflective liquid crystal display, and the embodiment of FIG. 17 illustrates the use of a reflective holographic combiner/lens and a transmissive liquid crystal display. Still another possibility is an embodiment using a transmissive holographic combiner/lens and a transmissive liquid crystal display as shown in FIG. 19 where the same reference numerals employed for the corresponding elements are distinguished by double primes. As in the embodiment of FIG. 17, the transmissive liquid crystal display 21" is illuminated by a diffused light source 23". However, as discussed hereinbefore, other light sources may be employed, provided that sufficient brightness in the narrow band desired is obtained. The narrow band is, of course, to be peaked at the proper wavelength for the holographic lens. That can easily be assured by the use of a proper light filter.

Still another possibility is the use of a liquid crystal display in combination with a conventional collimating lens system and combiner, i.e., in a head-up display system which is not restricted to a holographic combiner/lens. The advantages are a flat image source of higher brightness and efficiency than a CRT for display of both symbols and sensor video.

Figure 20:
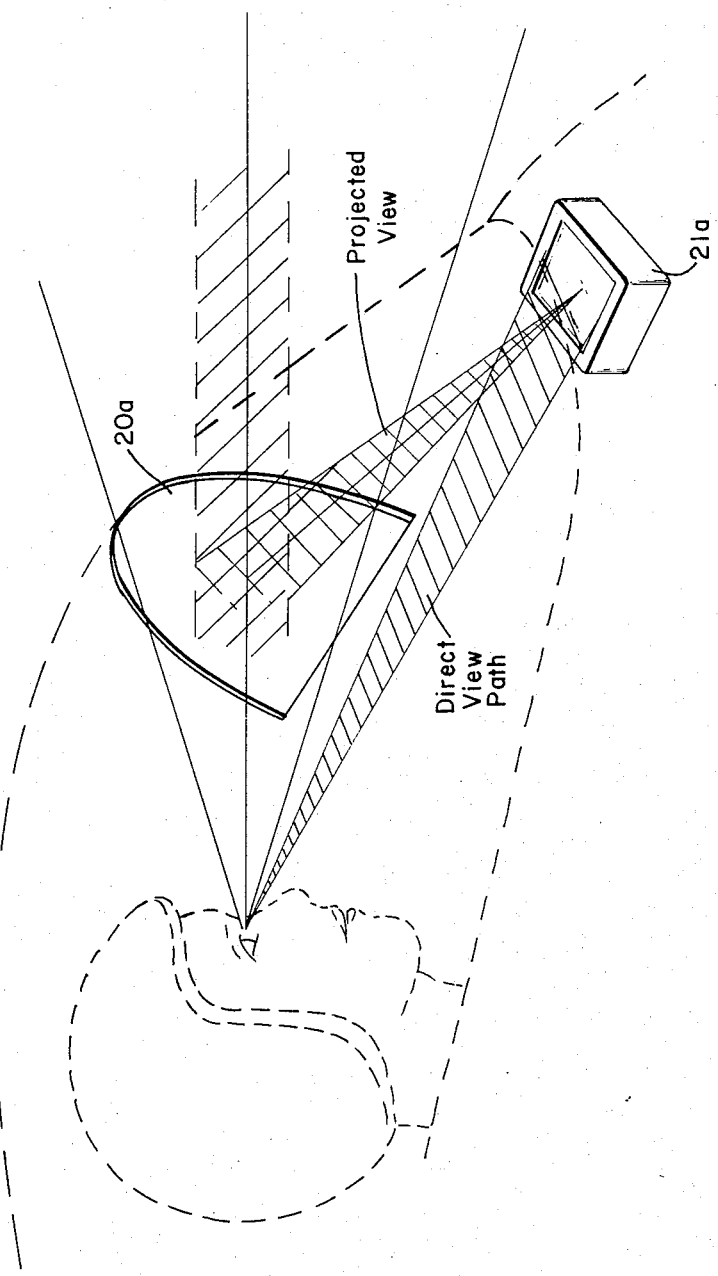
FIG. 20 illustrates a fourth embodiment of the present invention.

Although particular embodiments of the invention have been described and illustrated herein, it is recognized that modifications and variations may readily occur to those skilled in the art. Consequently, the following claims are intended to cover such modifications and variations. For example, a cathode ray tube or other light image generator may be used with the holographic lens provided sufficient brightness of the proper wavelength is available from such an alternate source for the display contrast desired. In addition to the advantages in using a holographic lens noted hereinbefore, there is a further advantage that, in the embodiments using transmissive holographic lens, it would be practical to move the image source to the image plane indicated in order to permit a direct head-down display as well as a head-up display, as shown in FIG. 20. There a holographic combiner/lens 20a is positioned across the upper part of the canopy in the field of view of the pilot while his head is up, and a display image source 21a is positioned to project image rays onto the lens at the proper angle. The angle is one which places the image display source sufficiently below the bottom edge of the holographic combiner/lens to provide the pilot with a direct view of the display image source. As described hereinbefore with reference to FIGS. 4 through 10, that angle is chosen at the time the holographic lens is produced. A shutter system may be added to selectively block the alternate paths, such that only the direct or the projected view path to the pilot is open.

What is claimed is:

1. In an aircraft, a head-up display system for use in displaying an image for viewing by a pilot in the pilot's field of view while looking out of the aircraft at a scene in a forward direction, comprising in combination:
   an aircraft canopy integral with the aircraft;
   a holographic lens comprising an optically transparent substrate having photoresponsive material having as an integral portion thereof a plurality of holographic elements in a side-by-side abutting arrangement for collimating light from a focal plane, and having a known operating bandwidth of light of preselected wavelengths, said lens being disposed in said aircraft in the field of view for collimating light directed to the pilot from all points of a light image produced in the focal plane and simultaneously combining the image light thus collimated and directed to the pilot with light from said scene whereby said pilot sees said image as if emanating from a source in said field of view at infinity, said holographic lens being disposed on the inside surface of said canopy;
   a relay lens; and
   means optically coupled to the holographic lens for producing said light image at said focal plane, said image having a peak band of wavelengths within the operating bandwidth of said holographic lens, and wherein said means for producing said light image at said focal plane is comprised of:
   an array of liquid crystal cells disposed in rows and columns in an image source plane, said relay lens projecting said image source plane to said focal plane, each cell of said array of liquid crystal cells comprising conductive plates parallel to said focal plane and a layer of liquid crystal material sandwiched in the mesophase state;
   an array of horizontal and vertical transparent conductors, each one of said horizontal conductors being connected to all cell plates on one side of said array of cells of a distinct one of said rows of cells, and each one of said vertical conductors being connected to all cell plates on another side of said array of cells of a distinct one of said columns of cells;
   means electrically connected to said transparent conductors, for selectively energizing said distinct one of each of the rows and columns of the conductors energized at one time to establish an electric field across said layer of liquid crystal between the plates of a single cell; and
   a light source so disposed as to illuminate said holographic lens through said array of cells and said relay lens, said source emitting light having said peak band of wavelengths, whereby light incident on said holographic lens is modulated at different points to produce said light image as a function of electric fields established across said cells.

2. The combination of claim 1 wherein said light source is disposed on the same side of said array of cells as said holographic lens and the conductive plate of each cell on the side of the array facing said light source is transparent while the other conductive plate of each cell is reflective to provide a liquid crystal image source operating in the reflective mode.

3. The combination of claim 2 wherein said light source is a point source and a collimating lens between said point source and said array of cells.

4. The combination of claim 3 wherein said holographic lens is formed for collimating light from a focal plane by recording interference patterns on a transparent film of recording medium, said patterns being formed by coherent light from said focal plane, and coherent light from a surface virtually at infinity, said light from said focal plane being everywhere coherent with light from said surface while recording, whereby light from points on said image means produced in said focal plane and incident on said recording medium after said holographic lens has been formed reconstructs collimated light from corresponding points on said surface virtually at infinity, thereby reconstructing said image with collimated light directed from said record medium to said pilot in the same direction as light from outside said aircraft in said field of view.

5. The combination of claim 4 wherein said interference patterns are recorded with light from said focal plane on said recording medium on a side opposite light from said surface virtually at infinity, and said holographic lens is disposed in said aircraft with said focal plane on the same side of said record medium as a seat for said pilot to provide a reflection-type holographic lens which also functions as a combiner.

6. The combination of claim 1 wherein said light source is disposed on the opposite side of said array of cells as said holographic lens and the conductive plates on both sides of said cells are transparent to provide a liquid crystal image source operating in a transmissive mode.

7. The combination of claim 6 wherein said light source is a diffused area source.

8. The combination of claim 6 wherein said holographic lens is formed for collimating light from a focal plane by recording interference patterns on a transparent film of recording medium, said patterns being formed by coherent light from said focal plane, and coherent light from a surface virtually at infinity, said light from said focal plane being everywhere coherent with light from said surface while recording, whereby light from points on said image means produced in said focal plaane and incident on said recording medium after said holographic lens has been formed reconstructs collimated light from corresponding points on said surface virtually at infinity, thereby reconstructing said image with collimated light directed from said record medium to said pilot in the same direction as light from outside said aircraft in said field of view.

9. The combination of claim 8 wherein said intereference patterns are recorded with light from said focal plane on the same side of said recording medium as light from said source virtually at infinity, and said holographic lens is disposed in said aircraft with said focal plane on the opposite side of said recording medium as a seat for said pilot to provide a transmission-type holographic lens which also functions as a combiner.

* * * * *